United States Patent
Sturm et al.

(10) Patent No.: US 11,349,942 B2
(45) Date of Patent: *May 31, 2022

(54) METHODS AND APPARATUS TO IDENTIFY SPONSORED MEDIA IN A DOCUMENT OBJECT MODEL

(71) Applicant: The Nielsen Compay (US), LLC, New York, NY (US)

(72) Inventors: Thomas Sturm, Sausalito, CA (US); Nicholas Naveen Rau, Larkspur, CA (US); Ryan J. O'Hearn, Oakland, CA (US); Jeremy Wade Bennett, San Francisco, CA (US)

(73) Assignee: The Nielsen Company (US), LLC, New York, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 16/565,448

(22) Filed: Sep. 9, 2019

(65) Prior Publication Data

US 2020/0007637 A1 Jan. 2, 2020

Related U.S. Application Data

(63) Continuation of application No. 14/854,734, filed on Dec. 29, 2014, now Pat. No. 10,409,884.

(Continued)

(51) Int. Cl.
*G06Q 30/02* (2012.01)
*G06F 16/958* (2019.01)
(Continued)

(52) U.S. Cl.
CPC ......... *H04L 67/22* (2013.01); *G06Q 30/0244* (2013.01); *G06Q 30/0277* (2013.01);
(Continued)

(58) Field of Classification Search
CPC ..... H04L 67/22; H04L 12/14; H04L 12/1435; H04L 47/808; H04L 43/0894;
(Continued)

(56) References Cited

U.S. PATENT DOCUMENTS 6,108,637 A 8/2000 Blumenau
6,389,467 B1 5/2002 Eyal
(Continued)

FOREIGN PATENT DOCUMENTS

KR 20000037250 7/2000

OTHER PUBLICATIONS

International Searching Authority, "International Search Report and Written Opinion," issued in connection with International Patent Application No. PCT/US2014/072562, dated Mar. 17, 2015, 11 pages.

(Continued)

*Primary Examiner* — Ahmed Elallam
(74) *Attorney, Agent, or Firm* — Hanley, Flight & Zimmerman, LLC

(57) ABSTRACT

Methods, apparatus, systems and articles of manufacture are disclosed to identify sponsored media in a Document Object Model. An example method includes in response to initiation of a search for sponsored media in a first branch of a document object model for a webpage, initiating a first timer having a first search time period and a second timer having a second search time period, the first search time period and the second search time period overlap, the search to be terminated upon completion of traversing the first branch when the search reaches a document node that is at a root of the first branch, the first branch including a candidate node. The example method also includes in response to identifying the candidate node as sponsored media, parsing the spon- (Continued)

sored media to generate monitoring information, and modifying a user agent setting to include a unique identifier.

33 Claims, 9 Drawing Sheets

Related U.S. Application Data

(60) Provisional application No. 62/020,028, filed on Jul. 2, 2014.

(51) Int. Cl.
  *H04L 67/50* (2022.01)
  *H04L 12/14* (2006.01)
  *H04L 47/80* (2022.01)
  *H04L 43/0894* (2022.01)

(52) U.S. Cl.
  CPC .......... *H04L 12/14* (2013.01); *H04L 12/1435* (2013.01); *H04L 47/808* (2013.01); *G06F 16/986* (2019.01); *H04L 43/0894* (2013.01)

(58) Field of Classification Search
  CPC ... H04L 47/70; H04L 41/0896; H04L 47/115; G06Q 30/0277; G06Q 30/0244; G06Q 30/0241; G06F 16/986; H04W 88/04
  See application file for complete search history.

(56) References Cited

U.S. PATENT DOCUMENTS

| | | | |
|---|---|---|---|
| 6,810,414 | B1 | 10/2004 | Brittain |
| 8,086,957 | B2 | 12/2011 | Bauchot et al. |
| 8,181,110 | B2 | 5/2012 | Worthington |
| 8,234,275 | B2 | 7/2012 | Grant et al. |
| 8,370,489 | B2 | 2/2013 | Mazumdar et al. |
| 8,667,015 | B2 * | 3/2014 | Jiao ................ G06F 16/986 |
| | | | 707/780 |
| 8,752,183 | B1 | 6/2014 | Heiderich et al. |
| 9,292,618 | B2 * | 3/2016 | Melnyk ............... H04L 67/2823 |
| 10,409,884 | B2 | 9/2019 | Sturm et al. |
| 2006/0026114 | A1 | 2/2006 | Gregoire et al. |
| 2008/0139191 | A1 | 6/2008 | Melnyk et al. |
| 2009/0150217 | A1 | 6/2009 | Luff |
| 2010/0030752 | A1 | 2/2010 | Goldentouch |
| 2010/0174774 | A1 | 7/2010 | Kern et al. |
| 2010/0306643 | A1 * | 12/2010 | Chabot ................ G06F 16/95 |
| | | | 715/234 |
| 2012/0143675 | A1 | 6/2012 | Aviv et al. |
| 2012/0144291 | A1 | 6/2012 | Chang et al. |
| 2012/0284801 | A1 | 11/2012 | Goodwin et al. |
| 2013/0227394 | A1 | 8/2013 | Sazhin et al. |
| 2014/0068411 | A1 | 3/2014 | Ross et al. |
| 2014/0278934 | A1 | 9/2014 | Gutierrez |
| 2016/0004781 | A1 | 1/2016 | Sturm et al. |

OTHER PUBLICATIONS

United States Patent and Trademark Office, "Advisory Action," issued in connection with U.S. Appl. No. 14/584,734, dated May 4, 2018, 7 pages.

United States Patent and Trademark Office, "Non-Final Office Action," issued in connection with U.S. Appl. No. 14/584,734, dated Jun. 15, 2018, 27 pages.

United States Patent and Trademark Office, "Final Office Action," issued in connection with U.S. Appl. No. 14/584,734, dated Jan. 11, 2019, 29 pages.

United States Patent and Trademark Office, "Non-Final Office Action," issued in connection with U.S. Appl. No. 14/584,734, dated Oct. 7, 2016, 18 pages.

United States Patent and Trademark Office, "Final Office Action," issued in connection with U.S. Appl. No. 14/584,734, dated Feb. 12, 2018, 27 pages.

United States Patent and Trademark Office, "Final Office Action," issued in connection with U.S. Appl. No. 14/584,734, dated Jun. 2, 2017, 21 pages.

United States Patent and Trademark Office, "Non-Final Office Action," issued in connection with U.S. Appl. No. 14/584,734, dated Oct. 5, 2017, 23 pages.

United States Patent and Trademark Office, "Notice of Allowance," issued in connection with U.S. Appl. No. 14/584,734, dated Apr. 23, 2019, 10 pages.

Aspnes, "Depth First Search," [https://web.archive.org/web/20140730080929/http://www.cs.yale.edu/homes/aspnes/pinewiki/DepthFirstSearch.html], retrieved on Jun. 11, 2018, 10 pages.

Greiman, Douglas. "Automatically Detecting Banner Ads in Web Pages," Stanford University; 2007; <http://cs229.stanford.edu/proj2007/Greiman-AutomaticallyDetectingBannerAdsInWebPages.pdf>, 5 pages.

Patent Cooperation Treaty, "International Preliminary Report on Patentability," issued in connection with application No. PCT/US2014/072562, dated Jan. 3, 2017, 7 pages.

\* cited by examiner

METHODS AND APPARATUS TO IDENTIFY SPONSORED MEDIA IN A DOCUMENT OBJECT MODEL

FIELD OF THE DISCLOSURE

This patent arises from a continuation of U.S. patent application Ser. No. 14/584,734, filed on Dec. 29, 2014 (now U.S. Pat. No. 10,409, 884), which claims the benefit of U.S. Provisional Patent Application Ser. No. 62/020,028, filed on Jul. 2, 2014. U.S. patent application Ser. No. 14/584,734 and U.S. Provisional Patent Application Ser. No. 62/020,028 are hereby incorporated by reference in their entireties.

FIELD OF THE DISCLOSURE

This disclosure relates generally to media measurement, and, more particularly, to methods and apparatus to identify sponsored media in a Document Object Model (DOM).

BACKGROUND

Audience measurement of media (e.g., any type of content and/or advertisements such as broadcast television and/or radio, stored audio and/or video played back from a memory such as a digital video recorder or a digital versatile disc (DVD), a web page, audio and/or video presented (e.g., streamed) via the Internet, a video game, etc.) often involves collection of media identifying information (e.g., signature(s), fingerprint(s), code(s), tuned channel identification, time of exposure information, etc.) and people data (e.g., user identifier(s), demographic data associated with audience member(s), etc.). The media identifying information and the people data can be combined to generate, for example, media exposure data indicative of amount(s) and/or type(s) of people that were exposed to specific piece(s) of media.

A Document Object Model (DOM) is a cross-platform and language-independent convention for representing and interacting with objects in documents. In DOM, documents (e.g., media, web pages, etc.) are modeled using nodes. The DOM encompasses not only the structure of a document, but also the behavior of the document and the nodes that comprise the document. In DOM, the nodes in a tree structure (e.g., the arrangement of information items that can be reached by using "tree-walking" methods) do not represent data structures, but, rather, the nodes represent objects (e.g., Hypertext Markup Language (HTML) objects) that have functions and identity. For example, an element node (commonly known as "Node Type 1") is an object that describes the data it contains, and may contain other element nodes or attribute nodes. An attribute node (commonly known as "Node Type 2") is an object that provides additional information about an element. A text node (commonly known as "Node Type 3") is an object that is representative of the textual content of an element or attribute. A comment node (commonly known as "Node Type 8") is an object that is representative of the content in a comment in a document. A document node (commonly known as "Node Type 9") is the root node of the document and is the primary access point to the documents data (e.g., the elements of the DOM).

The DOM is based on an object structure that closely resembles the structure of the document it models (e.g., a tree, a directed graph, etc.). In the DOM, documents have a logical structure similar to a "forest" or "grove," which can contain more than one tree. However, the DOM does not specify that documents must be implemented as a tree or a grove, nor does it specify how the relationships among objects are to be implemented. With the DOM, programmers may build documents, navigate the document structure, and/or add, modify and/or delete elements and/or content. Conceptually, the document is the root of the document tree (e.g., a node that is not a child of any other node), and provides the primary access to the document's data. Nodes found in an HTML or XML (Extensible Markup Language) document can be accessed, changed, deleted and/or added using the Document Object Model.

DETAILED DESCRIPTION

Figure 1:
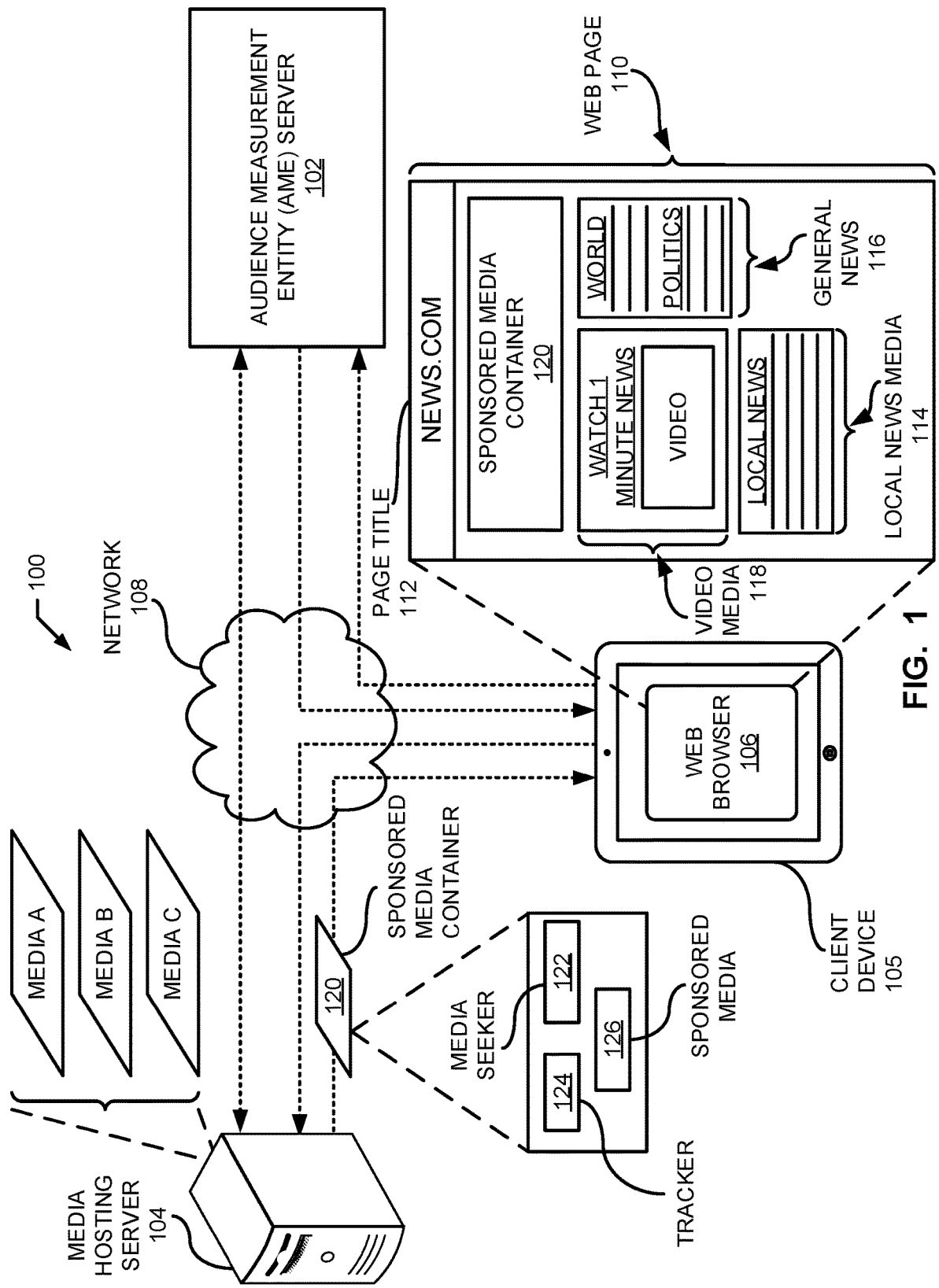
FIG. 1 is a block diagram of an example environment in which an example media seeker disclosed herein may be implemented to identify sponsored media in a Document Object Model.

Media may be used to convey many different types of information. For example, a web page may include media (e.g., visual images, video, audio, text, etc.) and/or links (e.g., uniform resource locators (URLs)) to media available on the Internet. In some examples, media may be used to disseminate advertisements to a mass audience. For example, sponsored media is media that is served (e.g., on web pages) (or otherwise distributed) and advertises, endorses, or otherwise conveys a message in support of a product, a service, a company, etc. of a person or entity paying (or otherwise sponsoring) the media provider to serve the sponsored media.

Monitoring impressions of advertisements, endorsements, or other sponsored media served to users is useful for generating impression statistics (e.g., reach and/or frequency) of the advertisements, endorsements, or other sponsored media. Thus, an impression is representative of the fact that member(s) of a home or an individual having been exposed to media (e.g., an advertisement, content, a group of advertisements and/or a collection of content, etc.). With respect to online media, a quantity of impressions or impression count is the total number of times media (e.g., an advertisement, an advertisement campaign, a streaming program, etc.) has been presented to and/or accessed by a web population.

Monitoring entities (sometimes referred to as "monitoring companies" or "audience measurement entities") desire knowledge of how users interact with media and media devices such as smart phones, tablets, laptops, smart televisions, etc. In particular, media monitoring entities want to monitor media presentations made at the media devices to, among other things, monitor exposure to advertisements, determine advertisement effectiveness, determine user behavior, identify purchasing behavior associated with various demographics, etc.

To enable monitoring of user access/exposure to sponsored media, in some examples, participating publishers and/or web sites insert or embed a tag within the source (e.g., Hypertext Markup Language (HTML) code) of the web pages that they serve. The tag may include JavaScript, Flash and/or other executable instructions, which cause exposure to the sponsored media to be tracked (e.g., recorded by a monitoring entity) when the tag executes on a requesting browser. Methods, apparatus and systems for tagging media are described in, for example, U.S. Pat. No. 6,108,637, by Blumenau, entitled "Content Display Monitor," which is hereby incorporated by reference in its entirety. Because a tag is embedded in the media (e.g., HTML defining a web page and/or referenced by a pointer in the HTML of a web page), the tag is executed whenever a browser renders the corresponding media (e.g., the web page).

Examples disclosed herein utilize a media seeker that identifies a sponsored media node in a Document Object Model (DOM) of media based on distinguishing assumptions and tiered tests. Each node in the DOM is representative of an object (e.g., an HTML object) in the media from which the DOM is modeled. In some examples disclosed herein, the media seeker performs a first test to check a node type of a node to be analyzed. For example, when a node of the DOM is analyzed, if the node is not an element node, then the media seeker eliminates the node from possibly being a sponsored media node, and analyzes the next node. Examples disclosed herein utilize the media seeker to perform a second test to check if the element node is a tag (e.g., script, executable instructions, etc.). If the node is identified to be a tag, then the media seeker eliminates that node from further processing, and the next node is analyzed.

In some examples disclosed herein, if a node is an element node and also not a tag, the media seeker performs a third test to check if the dimensions of the node satisfy geometric thresholds. For example, according to disclosed examples, sponsored media cannot be a 1×1 pixel or a 0×0 pixel. Accordingly, if the media seeker determines a node is a 1×1 pixel or a 0×0 pixel, the media seeker eliminates the node from further processing and the next node is analyzed. Likewise, industry standards dictate that advertisements have specified dimensions to be presented on a web page. For example, under current standards, a banner advertisement is 90 pixels tall. In some such examples, the geometric thresholds may not be satisfied if the dimensions of the node do not meet industry standards. Accordingly, if the dimensions of a node do not satisfy the geometric thresholds, the media seeker eliminates the node from further processing, and analyzes the next node.

In addition, some examples disclosed herein initiate multiple search attempts of the sponsored media node in a DOM built for a web page. For example, the media seeker disclosed herein may initiate search attempts in, for example, ten millisecond intervals if a sponsored media node is not identified in the DOM. In some examples, if the search time exceeds a threshold time, examples disclosed herein stop the search for the sponsored media node. For example, the example media seeker disclosed herein monitors the time (or number of search attempts initiated) since the web page was loaded. When an elapsed time satisfies the threshold time (e.g., one second), the media seeker stops the search for the sponsored media node.

Examples disclosed herein identify a node as the sponsored media node if the node has not been eliminated after performing the tiered tests. That is, examples disclosed herein operate under the assumption that the media container includes sponsored media and that processing of the media container initiates the media seeker. Thus, a node is considered a sponsored media node when the node is at least an element node, not a tag, and has dimensions that satisfy geometric thresholds (e.g., industry standards for sponsored media dimensions).

In some examples, it may also be advantageous to the sponsor and/or the media provider to determine the effectiveness of their media campaign. For example, the manufacturer and/or media provider may wish to know whether public opinion of the manufacturer decreases after a user is exposed to a particular piece of sponsored media. In some such examples, the audience measurement entity may want to compare survey results against a control (e.g., users who are presented with the web-poll and who were not exposed to the sponsored media). However, to limit bias, the control group and the test group (e.g., people who are exposed to the sponsored media and presented with the web-poll) should be sampled in similar environments.

Examples disclosed herein enable sampling users who access the same online media by visiting the same web page, creating a test group by exposing a portion of the sampled users to the sponsored media, and creating a control group by hiding or preventing exposure of the sponsored media for users in the control group. Some examples disclosed herein hide the sponsored media from the control group or prevent the control group from being exposed to the sponsored media by "blanking" the sponsored media. For example, examples disclosed herein replace the sponsored media with replacement media such as a public service announcement.

In some examples disclosed herein, the sponsored media may be modified to make playback of the sponsored media unperceivable to the user. For example, the sponsored media may be overlaid with a background color, the dimensions of the sponsored media may be modified (e.g., reduced to a 1×1 pixel area), etc. Thus, it is desirable to correctly identify the sponsored media. For example, "blanking" incorrect media (e.g., non-sponsored media) may "break" the web page and cause an error while loading.

In some examples disclosed herein, once the sponsored media node is identified in the DOM, a determination is made on whether the sponsored media can be "blanked" (e.g., hidden from the user). In some examples disclosed herein, the media seeker determines whether replacement media with the same dimensions as the sponsored media is available for replacing the sponsored media. If the sponsored media can be blanked (or otherwise hidden from display), the media seeker makes a further determination, based on a media campaign associated with the sponsored media, on whether to include the user in a test group, a control group or a non-sampled group (e.g., exclude the user from the sampled-group). If, however, the sponsored media cannot be blanked (e.g., the sponsored media node was not identified, replacement media for the sponsored media is not available, etc.), then the sponsored media is credited with an impression, and the user is included in either the test group or the non-sampled group, but not the control group.

FIG. 1 is a block diagram of an example environment 100 in which a media seeker 122 may be implemented to identify sponsored media in a DOM. The example environment 100 of FIG. 1 includes an audience measurement entity (AME) server 102, a media hosting server 104 and a client device 105. The example client device 105 executes a web browser 106. The example media seeker 122 is a tracker implemented in accordance with the example methods and systems disclosed herein. In the illustrated example, the web browser 106 initiates (e.g., executes) the media seeker 122 to identify sponsored media 126 included (or referenced) in a sponsored media container 120. Unlike some known trackers that use known, relative locations of the sponsored media 126 to identify the sponsored media 126 (e.g., when it is known that the sponsored media 126 and the tracker are at the same level in the DOM), the media seeker 122 utilizes recursion to examine sibling nodes as well as their child nodes (if any) to identify the sponsored media. As a result, the media seeker 122 increases the reliability of finding the sponsored media 126 in the sponsored media container 120, and, thereby, reducing the likelihood of identifying a wrong node as the sponsored media.

In the illustrated example, the AME server 102 communicates with the media hosting server 104 and/or the client device 105 via one or more wired and/or wireless networks represented by network 108. The example network 108 may be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variances thereof (e.g., communicates, in communication with, etc.), encompasses direct communication and/or indirect communication through one or more intermediary components and does not require direct physical (e.g., wired) communication and/or constant communication, but rather additionally includes communication at periodic or aperiodic intervals, as well as one-time events.

In the illustrated example of FIG. 1, an audience measurement entity operates and/or hosts the example AME server 102. The example audience measurement entity is an entity (e.g., The Nielsen Company (US), LLC) that monitors and/or reports influence of sponsored media. The AME server 102 of the illustrated example is a server and/or database that collects and/or receives monitoring information related to tagged media (e.g., media having inserted or embedded executable instructions that cause transmission of monitoring information to the audience measurement entity to be recorded by, for example, the AME server 102). Media may be tagged as described in U.S. Pat. No. 6,108,637 by Blumenau or using any other technique. The audience measurement entity of the illustrated example is a neutral entity that is not involved with the distribution of media (e.g., to avoid the appearance of bias).

In the illustrated example of FIG. 1, a media provider operates and/or hosts the example media hosting server 104 that responds to requests for media (the requested media may or may not include tag(s)). For example, the media provider may engage the audience measurement entity to collect and/or monitor information related to media associated with the media provider. Such a media provider may wish to use tagged media in a media campaign to determine the effectiveness of the media campaign.

In some examples, the media hosting server 104 is operated and/or hosted by a third party (e.g., an entity different than the media creator, the media proprietor and/or the AME). For simplicity, only one media hosting server 104 is shown in FIG. 1, although multiple media hosting servers are likely to be present.

In some examples, the AME server 102 is implemented using multiple devices and/or the media hosting server 104 is implemented using multiple devices. For example, the AME server 102 and/or the media hosting server 104 may include disk arrays or multiple workstations (e.g., desktop computers, workstation servers, laptops, etc.) in communication with one another.

The example client device 105 of the illustrated example shown in FIG. 1 is a device that retrieves media from the media hosting server 104 for presentation. In some examples, the client device 105 is capable of directly presenting media (e.g., via a display) while, in other examples, the client device 105 presents the media on separate media presentation equipment (e.g., speakers, a display, etc.). Thus, as used herein "media devices" may or may not be able to present media without assistance from a second device. Media devices are typically consumer electronics. For example, the client device 105 of the illustrated example is a tablet computer such as an iPad®, a Motorola™ Xoom™, etc., and thus, is capable of directly presenting media (e.g., via an integrated and/or connected display and speakers). While in the illustrated example, a tablet computer is shown, any other type(s) and/or number(s) of media device(s) may additionally or alternatively be used. For example, personal computers (e.g., desktop computers, laptop computers, etc.), Internet-enabled mobile handsets (e.g., a smartphone, an iPod®, etc.), video game consoles (e.g., Xbox®, PlayStation 3, etc.), digital media players (e.g., a Roku® media player, a Slingbox®, a Tivo®, etc.), smart televisions, servers, etc. may additionally or alternatively be used.

In the illustrated example of FIG. 1, the client device 105 is provided with the example web browser 106 to present media provided by the example media hosting server 104. In the illustrated example, the web browser 106 is implemented by a media player (e.g., a web browser, a local application, etc.) that presents media (e.g., a web page, an application, media, etc.). The web browser 106 may additionally or alternatively be implemented in Adobe® Flash® (e.g., provided in a SWF file), may be implemented in hypertext markup language (HTML) version 5 (HTML5), may be implemented in Google® Chromium®, may be implemented according to a device or operating system provider's media player application programming interface (API), may be implemented on a device or operating system provider's media player framework (e.g., the Apple® iOS® MPMoviePlayer software), etc., or any combination thereof. In some examples, the web browser 106 may be a service-specific application that renders media.

The example web browser 106 is used to access (e.g., request, receive, render and/or present online) media that is returned by the media hosting server 104. For example, the web browser 106 may request an example web page 110 including media (e.g., via an HTTP request) from the media hosting server 104. In the illustrated example, the web page 110 includes non-sponsored media such as an example page title 112, example local news media 114, example general news media 116 and example video media 118). The example video media 118 includes a text portion (e.g., section title "Watch 1 Minute News") combined with video.

Figure 5:
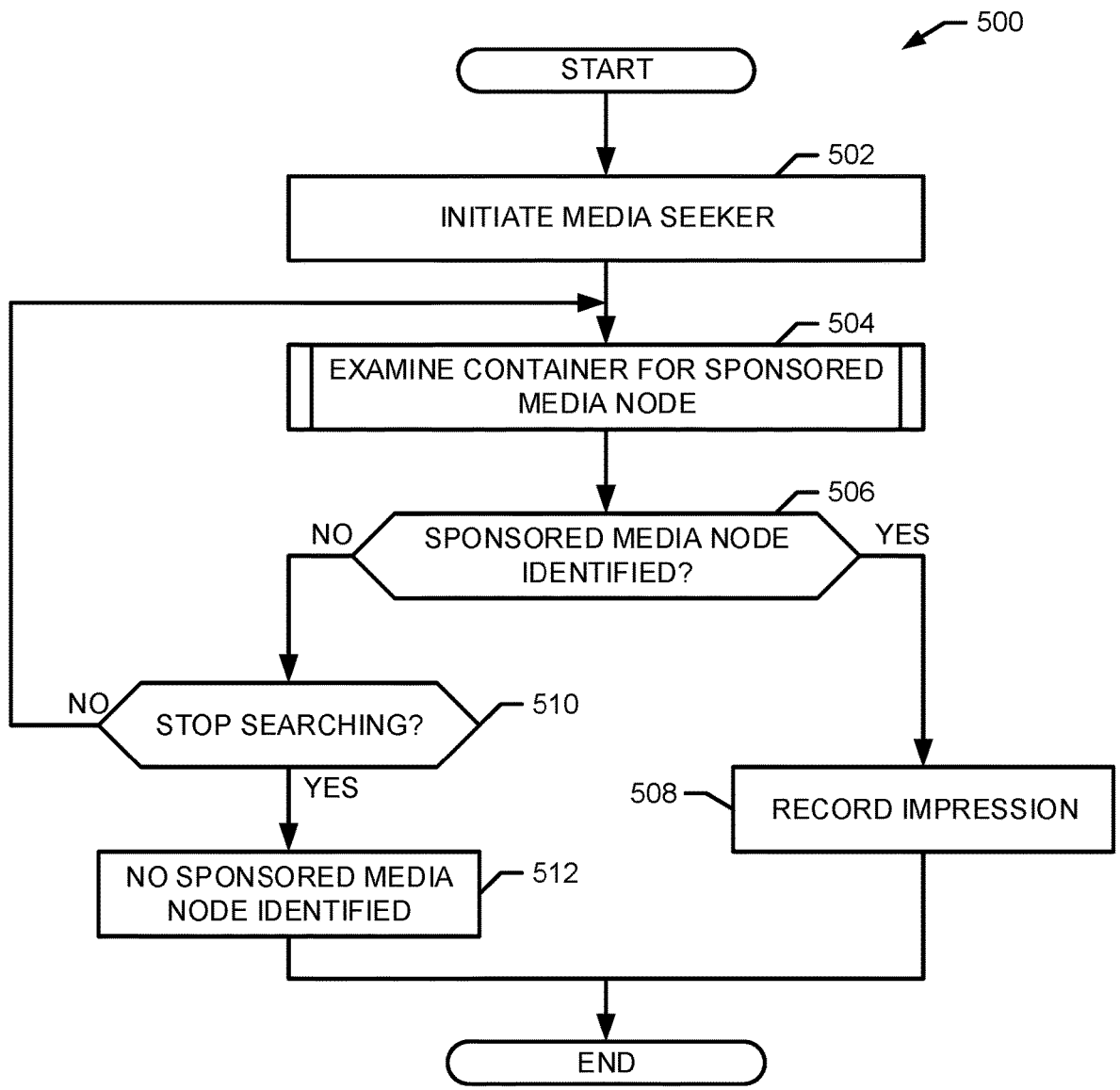
FIGS. 5-8 are flowcharts representative of example machine readable instructions that may be executed to identify sponsored media in the Document Object Model.

In the illustrated example of FIG. 5, the web page 110 also includes an example sponsored media container 120. Similar to the non-sponsored media 112, 114, 116, 118, the sponsored media container 120 loads at the same (or nearly the same) time as the other media. However, unlike the non-sponsored media, the sponsored media container 120 represents a placeholder for media (e.g., sponsored media) rather than the media itself. For example, the sponsored media container 120 may be an ad block including a reference to a uniform resource locator (URL) from which the web browser 106 may retrieve a banner advertisement for display in the sponsored media container 120 on the web page 110.

In some examples, the media of the web page 110 may be split into segments (or sections) using HTML frame elements such as IFRAMEs. For example, the local news media 114 may be positioned within a first frame element, the general news media 116 may be positioned within a second frame element and the video media 118 may be positioned within a third frame element. In another example, the local news media 114, the general news media 116 and the video media 118 may be positioned within a first frame element and the sponsored media container 120 may be positioned within a second frame element.

When the web browser 106 processes (e.g., accesses) the sponsored media container 120, the web browser 106 executes, renders and/or retrieves the objects included in the sponsored media container 120 (e.g., the media seeker 122, an example tracker 124 and sponsored media 126).

As discussed above, a media provider may engage the audience measurement entity to collect and/or monitor information related to media associated with the media provider. Advertising effectiveness metrics allow media providers (e.g., advertisers) to understand the degree to which advertising is effectively moving their target audience through the purchase funnel, from building awareness to creating intent and preference, to closing a purchase. Using advertising effectiveness metrics, media providers can assess their performance (e.g., in real-time), make adjustments as required to improve (e.g., optimize) advertising effectiveness against their target audience and, thus, increase (e.g., maximize) the return on their advertising investment. In some disclosed examples, survey responses are gathered evenly and randomly during the course of an online advertising campaign to ensure that the sample is free of any biases and is representative of the population. In some such examples, consumer sentiment is captured through a web-poll that asks each consumer (e.g., user) sampled a question to measure how the campaign performed against its primary objective. Examples disclosed herein utilize a concurrent test/control methodology by gathering survey results evenly and randomly throughout the campaign lifetime and, thereby, ensuring that bias is reduced (e.g., minimized) and that the sample is representative of the advertising campaign (e.g., the entire campaign). For example, when a user is selected for sampling, they may (1) be presented with the sponsored media, presented with replacement media (e.g., a public service announcement), or no media, and (2) prompted to answer a one question survey (e.g., questions such as whether the user owns a pet, how likely the user is to purchase SPONSOR PRODUCT in the next year, etc.).

In the illustrated example, in response to the request for media (e.g., a request initiated by the web browser 106), the media hosting server 104 returns instruction(s) (e.g., the example tracker 124) to cause the web browser 106 to inform the AME server 102 of the access to the media in the example sponsored media container 120.

In some examples, the sponsored media container 120 includes a reference to a tracker and/or executable monitoring instructions. For example, the tracker and/or executable monitoring instructions may be hosted at the AME server 102, which enables the audience measurement entity to directly control the content of the tag and/or executable monitoring instructions. In some examples, the tracker and/or executable monitoring instructions are hosted at the media hosting server 104. By including a reference to a tracker and/or executable monitoring instructions in the media, the content of the tracker (e.g., the executable monitoring instruction(s)) may be changed at any time without modifying the media. For example, the tracker and/or executable monitoring instructions may be updated to improve efficiency of collecting information for media (e.g., the media in the example sponsored media container 120) by updating the executable instructions hosted at the AME server 102 and/or the media hosting server 104.

As explained above, the executable monitoring instructions may be wholly in the sponsored media container 120 or may be distributed between the sponsored media container 120 and the AME server 102 and/or the media hosting server 104. Tagged media may, thus, include executable monitoring instruction(s) that serve as a tracker or a reference to monitoring instructions stored at an external location such as a server. In the latter case, the reference may be considered a first tag or portion of a tag and the external instruction may be considered a second tag or a portion of a tag.

In the illustrated example, executing the media seeker 122 facilitates identifying the sponsored media (or the reference to the sponsored media) in the sponsored media container 120. For example, the web browser 106 may build a DOM of the sponsored media container 120. In some examples, the web browser 106 builds a graphical representation of the objects of the sponsored media container 120. For example, the web browser 106 may build a graphical representation of the sponsored media container 120 in which the objects of the sponsored media container 120 are represented by element nodes, and the properties (or attributes) of the objects are defined by the branches of child nodes of each element node. Alternatively, the DOM may be a data structure that is stored in a memory for processing.

While traversing the nodes in the DOM, the example media seeker 122 examines the properties of each of the nodes, identifying candidate nodes when the node satisfies criteria or eliminating the node from further processing when the node fails the criteria. For example, the media seeker 122 may check the node type of the node, eliminating nodes that are not element nodes, or that are element nodes but also are executable instructions (e.g., a tag, script, etc.). The example media seeker 122 then compares the dimensions of the nodes that A) are element nodes and B) are not a tag to geometric thresholds, and identifies those nodes that satisfy the geometric thresholds as candidate nodes while eliminating those nodes which fail to satisfy the geometric thresholds. For example, if a node is a 1×1 pixel, or not at least a threshold height or width, then the node is eliminated from further consideration as the sponsored media node. In the illustrated example, the media seeker 122 also checks if replacement media having the same dimensions as the candidate node is available. When the example media seeker 122 determines that replacement media is available, then the candidate node is considered a sponsored media node and is identified as such.

In the illustrated example of FIG. 1, when a sponsored media node is identified, the media seeker 122 determines whether to include the user in a media campaign survey for the sponsored media. For example, the media seeker 122 may determine to include the user in a test group (e.g., expose the user to the sponsored media and survey the user), a control group (e.g., not expose the user to the sponsored media (e.g., by hiding the sponsored media) and survey the user), or a non-sampled group (e.g., expose the user to the sponsored media and not survey the user), based on media campaign preferences. In some examples, when the media seeker 122 determines to include the user in the control group, the media seeker 122 may "blank" the sponsored media. For example, the media seeker 122 may present replacement media having the same dimensions as the sponsored media node instead of the sponsored media and/or may present a blank or empty space in place of the sponsored media.

In the illustrated example, when the media seeker 122 eliminates a node from consideration as the sponsored media node, the media seeker 122 checks if the node has a child node. When a node is discovered to have one or more child nodes, the example media seeker 122 uses recursion to examine the child nodes. In this manner, the example media seeker 122 traverses through the nodes in the DOM. In addition, the example media seeker 122 initiates multiple search attempts for the sponsored media node in the DOM. For example, the media seeker 122 may initiate search attempts in ten millisecond intervals, if a sponsored media node is not identified in the DOM, to analyze nodes which may not have existed at the time the web page 100 was initially loaded by the web browser 106.

In some examples, the AME server 102 hosts the replacement media for presenting to a user in place of the sponsored media. For example, the AME server 102 of the illustrated example may include a media database that stores image files and/or other types of media files. Additionally or alternatively, the AME server 102 may be in communication with a separate media database (e.g., a server of a third-party contracted by the audience measurement entity) that hosts the replacement media. In some such examples, the AME server 102 retrieves the replacement media from the separate media database to serve the replacement media to the requesting device. Alternatively, the separate media database may include a server to serve the hosted media directly to the client device 105. In another alternative, the replacement media may be media stored in the client device 105.

Figure 2:
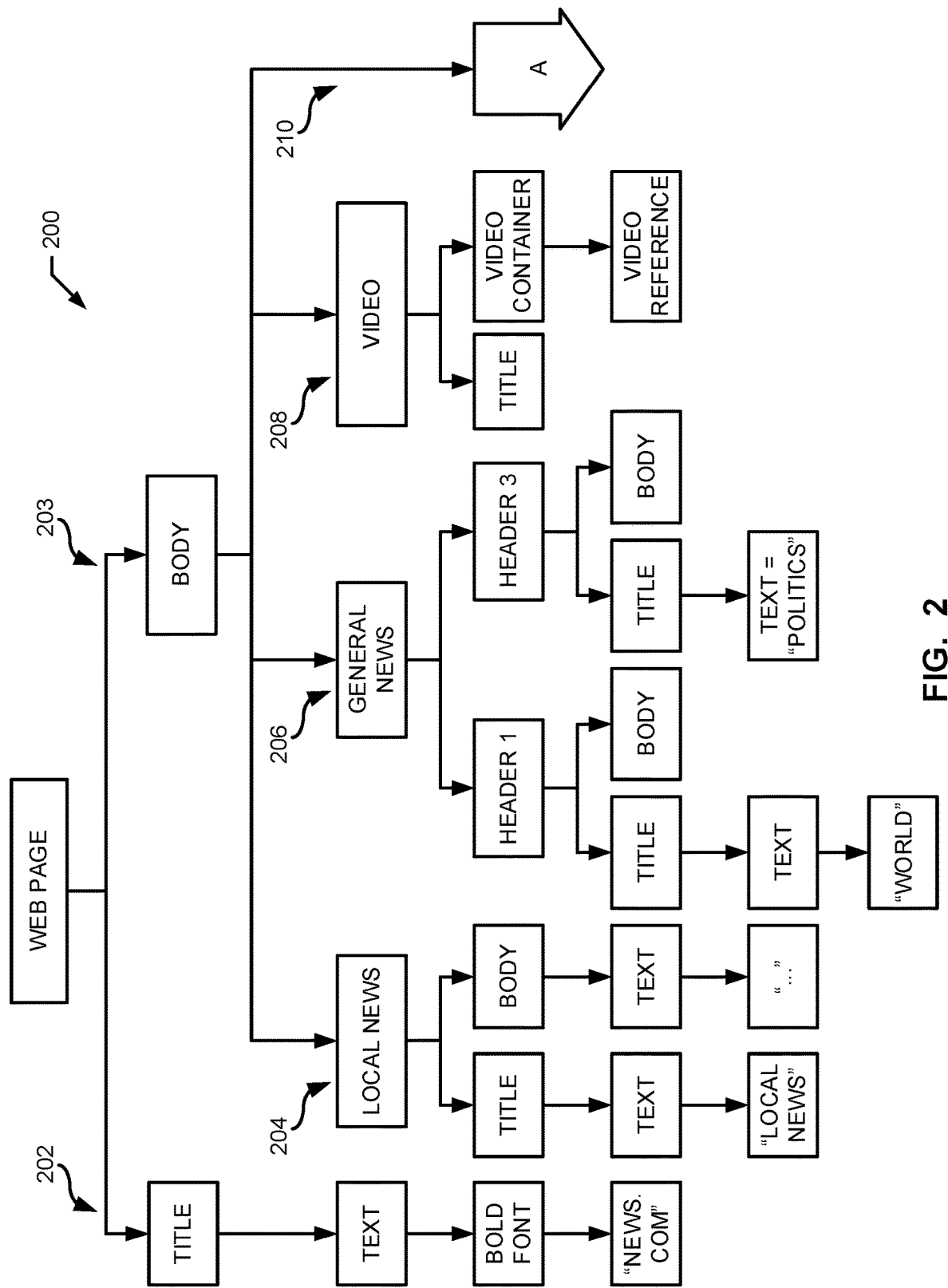
FIG. 2 illustrates a portion of an example Document Object Model generated for the example web page of FIG. 1.

The Document Object Model can assist in navigating media and its segments. FIG. 2 is a graphical representation 200 of the example web page 110 (FIG. 1) using the Document Object Model (DOM). In the illustrated example of FIG. 2, the graphical representation 200 is a model of the logical structure of the web page 110 when the web page 110 is loaded by a web browser. For example, the web browser 106 may download the HTML of the web page 110 into a local memory, parse the HTML to build the graphical representation 200, and present (e.g., display) the corresponding web page 110 on a screen. In the illustrated example of FIG. 2, the different segments of the example web page 110 are used to build the graphical representation 200. For example, the graphical representation 200 of FIG. 2 indicates that the web page 110 includes two sub-sections (e.g., a title and a body). In the illustrated example, the page title 112 of the web page 100 is represented by an example title branch 202. The characteristics of the page title 112 can be determined by traversing the nodes of the title branch 202 of the graphical representation 200. For example, the title branch 202 has a text node, and has a first attribute instructing that the font is a "bold" font, and a second attribute instructing that the value of the text is "NEWS.COM."

As another illustrative example, the body section of the web page 110 is represented by an example body branch 203. The properties of the body section of the web page 110 can be determined by traversing the nodes of the body branch 203. In the illustrated example, traversing the body branch 203 indicates that the body section includes sub-sections (e.g., elements) of its own, which correspond to the different media included in the web page 110. In the illustrated example, each sub-section of the body branch 203 is implemented using a different frame element.

An example local news branch 204 corresponds to the local news media 114 of the web page 110. The properties of the local news media 114 are defined by the nodes of the local news branch 204 of the graphical representation 200. An example general news branch 206 corresponds to the general news media 116 of the web page 110. The properties of the general news media 116 are defined by the nodes of the general news branch 206 of the graphical representation 200. An example video branch 208 corresponds to the video media 118 of the web page 110. The properties of the video media 118 are defined by the nodes of the video branch 208 of the graphical representation 200.

In the illustrated example of FIG. 2, the body branch 203 also includes an example sponsored media container branch 210, which is loaded at the same time as the other branches 204, 206, 208 and their corresponding nodes. The example sponsored media container branch 210 corresponds to the sponsored media container 120 of the web page 110. The properties of the sponsored media container branch 210 are defined by the nodes of the sponsored media container branch 210 of the graphical representation 200.

Figure 3:
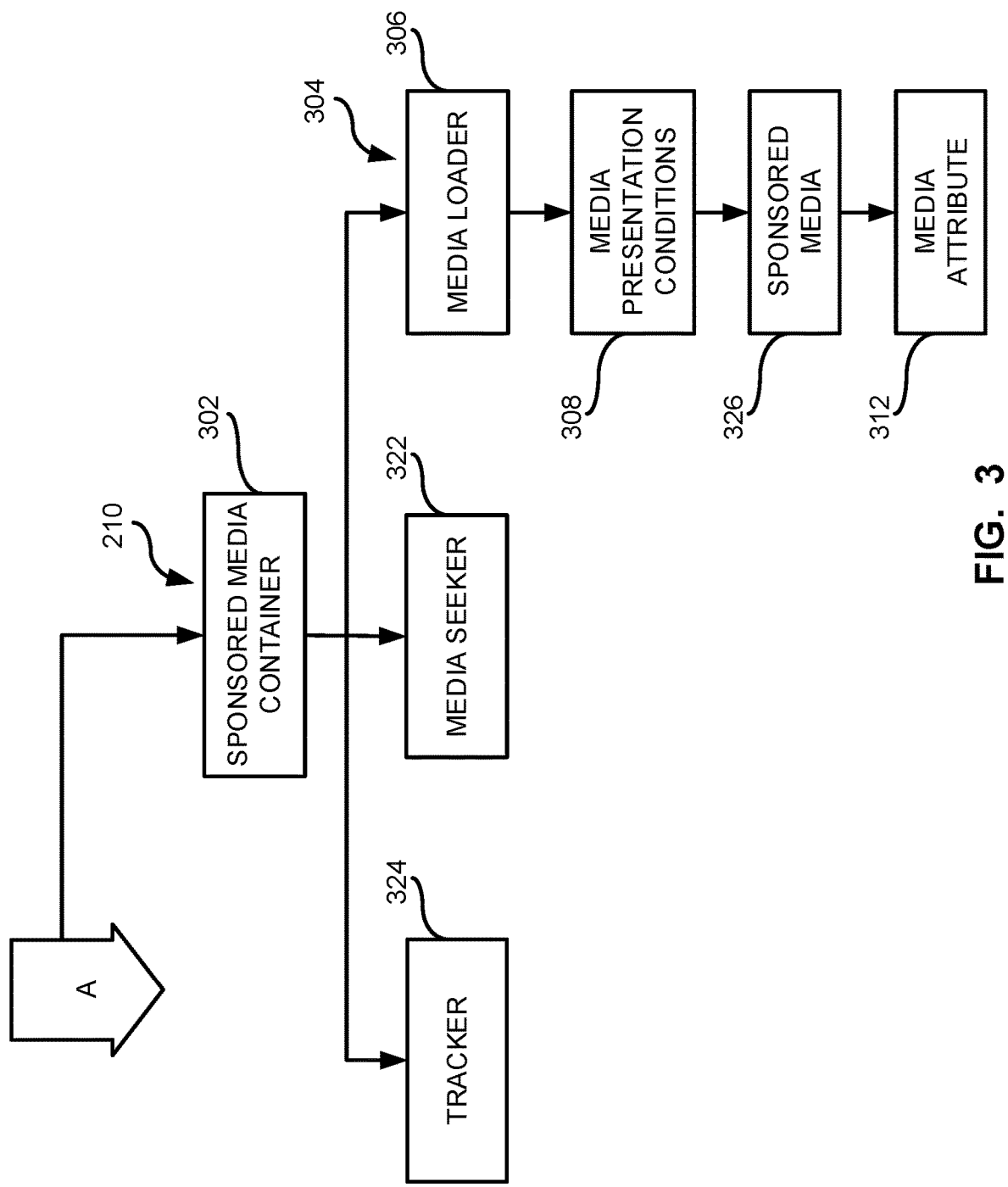
FIG. 3 illustrates a portion of the example Document Object Model of FIG. 2.

FIG. 3 illustrates a portion of the Document Object Model 200 (FIG. 2) built when loading the example web page 110 (FIG. 1). The illustrated example of FIG. 3 includes the sponsored media container branch 210.

As described above, it may be beneficial for media sponsors to track the effectiveness of their sponsored media. In the illustrated example of FIG. 3, the sponsored media container node 302 includes an example media seeker 322 that corresponds to the example media seeker 122 of FIG. 1 and includes an example tracker 324 that corresponds to the tracker 124 of FIG. 1. The example media seeker 322 and the example tracker 324 are tags that facilitate collection of monitoring information for sponsored media in the example sponsored media container 120. In the illustrated example, when a web browser renders the sponsored media container node 302, the media seeker 322 and the tracker 324 are executed and collect monitoring information. For example, a web page host may be interested in learning when their sponsored media containers are processed and, thus, the tracker 124 may record when the sponsored media container node 302 is processed by a web browser.

In the illustrated example, the sponsored media container node 302 includes an example media loader branch 304, which includes an example media loader node 306 to load the sponsored media 326 and an example media presentation conditions node 308 that defines which media to present. In the illustrated example, executing the media loader branch 304 results in different sponsored media being presented based on the time-of-day. For example, when the sponsored media container node 210 is executed, the media presentation conditions node 308 retrieves a first sponsored media when the time-of-day is between 9:00 AM and 4:59 PM, retrieves a second sponsored media when the time-of-day is between 5:00 PM and 12:59 AM, or retrieves a third sponsored media when the current time-of-day is between 1:00 AM and 8:59 AM. An example media attribute node 310 defines attributes (e.g., properties such as dimensions) of the retrieved sponsored media 126.

Typically, to identify the sponsored media 126 in the sponsored media container node 302, an audience measurement entity instructs a publisher to position the tracker "next to" the sponsored media 126. In some such examples, when the tracker is executed, the tracker 124 checks its sibling nodes (e.g., nodes that have the same parent node) to determine which of the siblings is the sponsored media. Performing such a "static" search is useful when the relative location of the sponsored media in the container node is known (e.g., when it is known that the sponsored media 126 and the tracker are at the same level in the DOM). For example, the tracker 124 may check if the node(s) to its left is the sponsored media and check if the node(s) to its right (e.g., the media seeker 322 and the media loader 306) is the sponsored media. In some such examples, when the tracker 124 identifies the sponsored media node, the tracker 124 records an impression for the corresponding sponsored media. However, as illustrated in FIG. 3, neither of the sibling nodes 322, 306 are the sponsored media node. As a result, the example tracker 124 records no impression for the sponsored media corresponding with the sponsored media node 326.

Moreover, it is becoming more and more common for media producers to utilize dynamically created objects. As a result, when the DOM for media is built by a web browser, the position of the sponsored media in the sponsored media container node can vary. For example, element nodes may include nested element nodes that load at different times or may not exist until certain conditions are satisfied. In addition, different tracker objects may create different elements in the DOM (e.g., <p> elements versus <div> elements) with significantly different properties and/or attributes such as width and/or height representative of corresponding sponsored media may be missing or incorrect. Additionally, once built, any of the elements in the DOM may be incomplete due to errors in tracking scripts or other elements included in the media.

In some examples, the tracker 124 may identify the wrong node as the sponsored node (e.g., because it is only examining nodes that are not the sponsored media and may select the best match). In some such examples, if the tracker 124 is to "blank" the sponsored media from presentation (e.g., for a control group), the tracker 124 having identified the wrong node as sponsored media would "blank" the incorrect node, which may result in causing the sponsored media container 120 to be inoperable, resulting in an error and/or incorrect information collected by the tracker 124.

As described below in connection with FIG. 4, the media seeker 122 addresses the issue of dynamically created objects by traversing the nodes in a DOM via recursive calls. For example, the media seeker 122 identifies a parent node of the media seeker 322 in the sponsored media container 120 and selects a child node of the parent node. For example, the media seeker 122 may select the sponsored media container node 302 as the parent node and then select the tracker 324 as the child node. Using recursion techniques, the example media seeker 122 parses the nodes of the branch associated with the child node (e.g., the tracker 324). If no sponsored media node is identified in the tracker 324 branch, the example media seeker 122 determines whether the tracker 324 has a sibling node, and, if so, uses a similar technique to examine the node of the sibling node. For example, the media seeker 122 may select the media loader node 306 and parse the nodes of the media loader branch 304 to find the sponsored media 126. In this manner, the media seeker 122 traverses through the nodes in the tree-like structure of the DOM to locate and monitor sponsored media.

Figure 4:
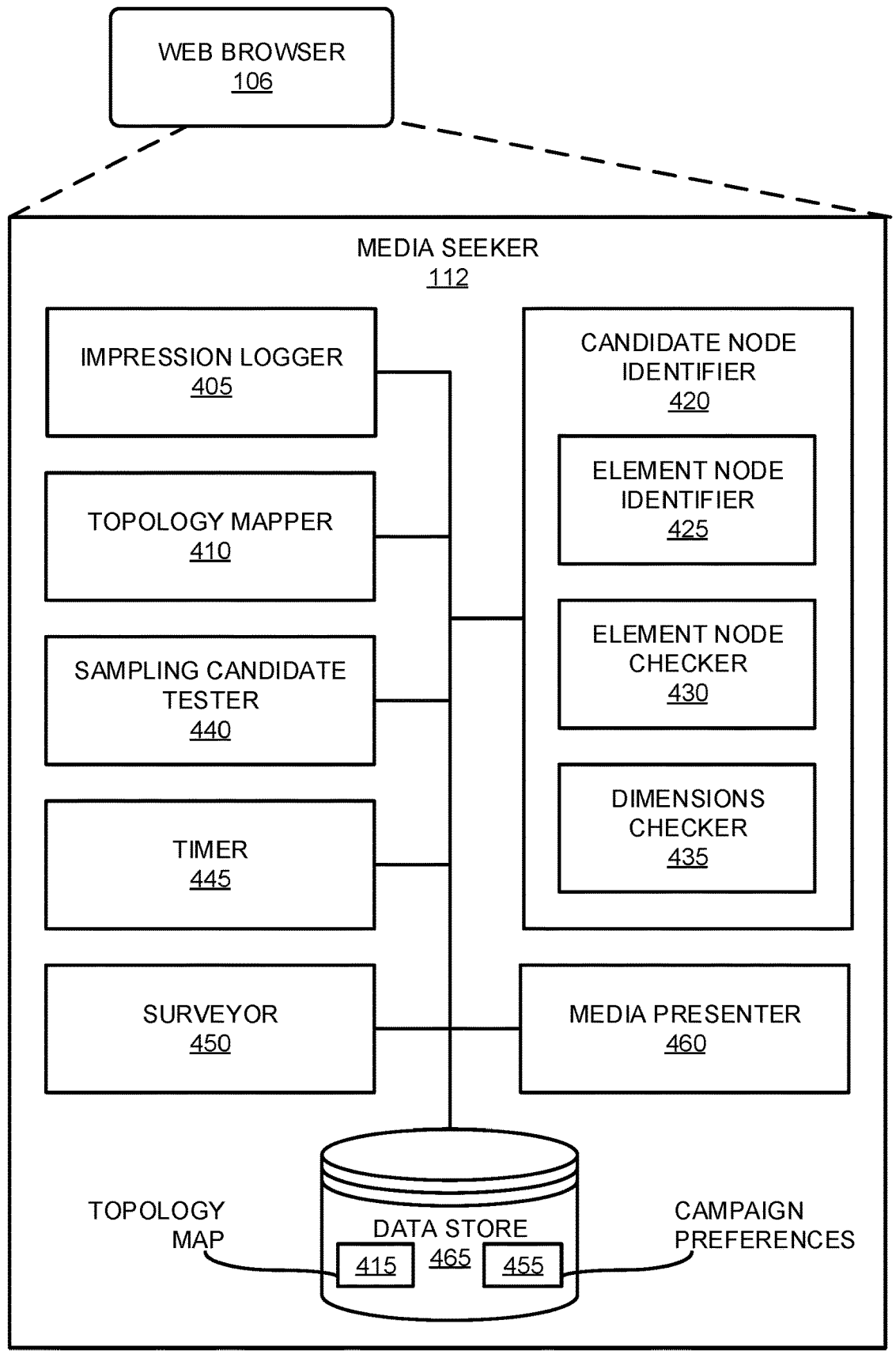
FIG. 4 is a block diagram of an example implementation of the media seeker of FIG. 1 to identify sponsored media in the Document Object Model.

FIG. 4 is a block diagram of an example implementation of the media seeker 112 of FIGS. 1 and/or 3. In the illustrated example, the media seeker 112 includes an example impression logger 405, an example topology mapper 410, an example candidate node identifier 420, an example element node identifier 425, an example element node checker 430, an example dimensions checker 435, an example sampling candidate tester 440, an example timer 445, an example surveyor 450, an example media presenter 460 and an example data store 465. The example data store 465 of FIG. 4 may be implemented by any storage device and/or storage disc for storing data such as, for example, flash memory, magnetic media, optical media, etc. Furthermore, the data stored in the data store 465 may be in any data format such as, for example, binary data, comma delimited data, tab delimited data, structured query language (SQL) structures, etc. While in the illustrated example the data store 465 is illustrated as a single database, the data store 465 may be implemented by any number and/or type(s) of databases.

In the illustrated example of FIG. 4, the media seeker 112 is provided with the example impression logger 405 to collect monitoring information corresponding with sponsored media presented in the sponsored media container 120 obtained from the media hosting server 104. The example impression logger 405 of FIG. 4 sends collected monitoring information to the example AME server 102. In the illustrated example, the impression logger 405 detects when the media seeker 112 identifies sponsored media (e.g., the sponsored media 126) and, in response, the example impression logger 405 parses or scans the identified sponsored media 126 to generate monitoring information. For example, the impression logger 405 may identify a media source from which the media was received (e.g., a vendor ID, a source identifier, a uniform resource locator (URL)), a network address of the client device 105, an identifier of the client device 105 and/or an identifier of the web browser 106, etc.

In some examples, the impression logger 405 prepares a beacon to send the monitoring information to the AME server 102. The beacon may be a communication such as a request (e.g., an HTTP GET request, an HTTP POST request, etc.) to the AME server 102. Thus, the example beacon generated by the impression logger 405 includes the monitoring information generated and/or collected by the media seeker 112. Because a beacon may appear to the web browser 106 as a standard link or request to retrieve Internet media or transmit data, most standard browsers will participate in the audience measurement process without requiring modification. As a result, the described tagging enables collection of data from panelists and non-panelists alike. Therefore, data collected via a tagging approach such as that described above, is referred to herein as census data.

In some instances, it may be useful to link demographics and/or other user information to census data. For example, a sponsor or media provider may want to know the demographics (e.g., race, age, income, home location, education level, gender, etc.) of users who viewed media provided by the sponsor or media provider. Methods, apparatus and systems for modifying information included in a beacon transmitted to an audience measurement entity server to include a unique identifier are described in, for example, U.S. Patent Publication No. 2014/0278934, by Gutierrez, entitled "Methods and Apparatus to Integrate Tagged Media Impressions with Panelist Information," which is hereby incorporated by reference in its entirety. For example, if the user is a panelist, the impression logger 405 may modify a user agent included in the beacon. For example, the impression logger 405 may modify the user agent setting of the web browser 106 to include panelist identifying information (e.g., a unique identifier such as a panelist telephone number) associated with the panelist. In some such examples, when the beacon is sent to the AME server 102 in response to processing the sponsored media container 120, the beacon includes the modified user agent including the unique identifier, and the impression entry logged at the AME server 102 may be associated with information (e.g., demographics) known about the panelist. Other techniques for including demographics and additional information with the monitoring information may be utilized.

In some examples, an audience measurement entity may work in cooperation with database proprietors such as online web services providers to increase panel sizes. Methods, apparatus and systems for partnering with database proprietors to leverage the content tagging capabilities of the audience measurement entity and the use of databases of non-ratings entities such as social media and other web sites to create a large, demographically accurate panel that results in accurate, reliable measurements of exposure to Internet content such as advertising and/or programming are described in, for example, U.S. Pat. No. 8,370,489, by Mazumdar et al., entitled "Methods and Apparatus to Determine Impressions Using Distributed Demographic Information," which is hereby incorporated by reference in its entirety.

In some examples, the impression logger 405 may send more than one beacon to the AME server 102. For example, the impression logger 405 may generate a beacon to communicate the collected monitoring information to the AME server 102 and may generate another beacon to communicate when a sponsored media node is identified. In some examples, the impression logger 405 may generate a beacon if a user is selected to be sampled and/or the user is included in the test group, the control group or the non-sampled group. In some examples, if the user is selected to be in the sampled pool (e.g., selected to be in the test group or the control group), the impression logger 405 may generate another beacon including the user's answers to a survey presented to members of the sampled pool. In some examples, the impression logger 405 generates a beacon to communicate when an error occurs and/or when a sponsored media node is not identified.

In some examples, the impression logger 405 may be native functionality of a browser that is activated by instructions (e.g., executable instructions received in tagged content). For example, the impression logger 405 may be a JavaScript interpreter that executes JavaScript instructions included in or linked to media. Alternatively, the impression logger 405 may be a browser plug-in. For example, the impression logger 405 may be a web-based plug-in for the example web browser 106.

As described above, the DOM is a model that describes how the objects in a document (e.g., media, a web page, etc.) are related to each other. In the illustrated example of FIG. 4, the media seeker 112 includes the example topology mapper 410 to build a DOM of the sponsored media container 120, and to navigate through the nodes in the DOM. For example, the topology mapper 410 may select the sponsored media container 120 as the topmost node and perform introspection of the nodes of the sponsored media container 120 to generate a tree-like structure (e.g., an example topology map 415) mapping the topology of the sponsored media container 120. In the illustrated example of FIG. 4, introspection enables the example topology mapper 410 to obtain information from the nodes in the topology map 415. For example, the topology mapper 410 may identify element nodes contained within the sponsored media container 120 including such element nodes as the tracker 324 and the media loader 306.

In some examples, if the topology mapper 410 determines that the topmost node is a document node (e.g., a "Node Type 9" node), and then the topology mapper 410 may quit searching for the sponsored media node. For example, a document node may be the primary access point to the data of the web page 100. In some such examples, accessing the primary access point may result in accessing objects in the DOM unrelated to the sponsored media container 120 and/or the media seeker 112 (e.g., where the media seeker 120 is attempting to locate sponsored media in the sponsored media container node 302 it may be undesirable and/or unauthorized for the topology mapper 410 to access the body and/or other nodes outside the sponsored media container node 302 in the DOM illustrated in FIGS. 2 and 3). To protect user privacy, the topology mapper 410 of FIG. 4 terminates the searching for the sponsored media node when a Node Type 9 node is identified. Alternatively, the topology mapper 410 may move back down a level from the Node Type 9 node and continue searching in the sponsored media container.

In the illustrated example, the topology mapper 410 builds the topology map 415 using recursive calls. For example, the topology mapper 410 may identify a parent node in the sponsored media container 120 and process the child nodes of the parent node, and the branches associated with the child nodes. In the illustrated example, the example topology mapper 410 identifies a first node for processing and then waits until a determination is made on whether the first node is a sponsored media node or is not a sponsored media node. If the first node is not a sponsored media node, then the example topology mapper 410 checks if the first node has a child node, and identifies the child node as the next node for processing when the first node has a child node. If the first node does not have a child node, then the example topology mapper 410 checks if the first node has a sibling node. The example topology mapper 410 then identifies the sibling node for processing. Using a similar process of checking if a selected node has a child node and then a sibling node and repeating the process as child nodes and/or sibling nodes are discovered, the topology mapper 410 builds the topology map 415 by identifying nodes in the one or more branches extending from the first node.

When a currently selected node being analyzed is not identified as a sponsored media node, and the currently selected node has no child nodes and no sibling nodes, the topology mapper 410 returns to the node that called the currently selected node (e.g., the node processed before the selected node was processed). In this manner, the example topology mapper 410 discovers the nodes that are on the same "level" of the DOM (e.g., sibling nodes of a node), as well as nodes that are on lower "levels" of the DOM (e.g., child nodes, grandchild nodes, etc.).

As described above, parsing (e.g., processing) a DOM of a web page is becoming more and more complex as the objects in the web page become more and more complicated. As a result, identifying a sponsored media node in the DOM is becoming increasingly difficult. For example, dynamic objects may not exist in the web page (e.g., or the DOM) at the time an initial search for sponsored media was initiated in the DOM. When the topology mapper 410 of the illustrated example is initiated, the topology mapper 410 repeatedly builds DOMs (e.g. or iteratively updates and/or analyzes DOMs) of the sponsored media container 120 until a time threshold is satisfied or a sponsored media node is identified. For example, the topology mapper 410 may initiate building a DOM in ten millisecond intervals. In this manner, the example topology mapper 410 may discover child nodes and/or sibling nodes of the element nodes that are dynamically added over time. However, when a time threshold is satisfied (e.g., one second expires), the example topology mapper 410 stops building a DOM of the example sponsored media container 120.

In the illustrated example of FIG. 4, the media seeker 112 includes an example candidate node identifier 420 and an example sampling candidate tester 440. The example candidate node identifier 420 of FIG. 4 examines the properties (e.g., attributes) of a node to determine if the node is a candidate (e.g., a node that is a candidate for being a sponsored media node). In the illustrated example, the candidate node identifier 420 takes advantage of the fact that an object in the sponsored media container 120 that is sponsored media has characteristics that distinguish the sponsored media from objects in the sponsored media container 120 that are not sponsored media. For example, in some systems, sponsored media cannot be an attribute (e.g., "bold" font), sponsored media cannot be executable instructions (e.g., a tag, script, etc.), and sponsored media cannot be less than a threshold height and/or a threshold width. Accordingly, the example candidate node identifier 420 of the illustrated example processes a node in the topology map 415 and eliminates the node from further consideration as a sponsored media node if the node is determined to have attributes not associated with sponsored media (e.g., by applying a set of rules). For example, the candidate node identifier 420 may add the eliminated node to a list of eliminated nodes.

In the illustrated example of FIG. 4, the candidate node identifier 420 includes an example element node identifier 425 to check the node type of a node. For example, the element node identifier 425 obtains a node to process from the example topology mapper 410 and/or the topology map 415 and checks whether the node is an element node. If the element node identifier 425 determines that the node type is something other than an element node (e.g., the node type of the node is not "Node Type 1"), the example candidate node identifier 420 eliminates the node from further processing, and sends a message to the topology mapper 410 that the node was not a sponsored media node.

In the illustrated example of FIG. 4, the example candidate node identifier 420 includes an example element node checker 430 that checks if a node is a tag (e.g., script, executable instructions, code, etc.). If the example element node checker 430 determines that the node is a tag, the example candidate node identifier 420 eliminates the node from further processing, and sends a message to the topology mapper 410 that the node was not a sponsored media node.

In the illustrated example of FIG. 4, the example candidate node identifier 420 eliminates nodes from further consideration as a sponsored media node based on dimensions (e.g., height and width) of the node. In the illustrated example, the candidate node identifier 420 includes an example dimensions checker 435 to compare the dimensions of a node to one or more geometric thresholds. For example, the dimensions checker 435 may eliminate a node from further consideration if the node has dimensions of a 1×1 pixel or a 0×0 pixel. For example, a node that is a tracker object is typically a small object and not meant for presentation. As such, when the example dimensions checker 435 determines the dimensions of the node are not larger than, for example, a 1×1 pixel, the candidate node identifier 420 eliminates the node from further consideration as a sponsored media node and sends a message to the topology mapper 410 accordingly.

Industry standards dictate that advertisements have specified dimensions to be presented on a web page. This may be useful, for example, if a media provider wants to vary the sponsored media presented in a certain ad slot. For example, under current standards, a banner advertisement is 90 pixels tall and 728 pixels wide. Accordingly, in the illustrated example of FIG. 4, the example dimensions checker 435 determines whether the node is at least 90 pixels tall and/or 728 pixels wide. If the example dimensions checker 435 determines the dimensions of the node are not at least 90 pixels tall and/or 728 pixels across, the candidate node identifier 420 eliminates the node from further consideration as a sponsored media node and sends a message to the topology mapper 410 accordingly.

In some examples, the candidate node identifier 420 administers the various tests in an order that reduces the amount of computational work done by the media seeker 112 and/or is otherwise easier to perform. For example, checking if a node is an element node may use less computational work than determining if the node is a tag. Thus, the candidate node identifier 420 may first instruct the element node identifier 425 to check the node type of a node and eliminate the node from further processing (e.g., computational work performed) if the node is not an element node. The candidate node identifier 420 may then instruct the element node checker 430 to determine whether the element node is a tag. Likewise, when determining whether the dimensions of a node satisfy geometric thresholds, it may be computationally more efficient to first check if the node has dimensions larger than a 1×1 pixel, and then check if the node is at least a minimum height and/or a minimum width. In some such examples, the example dimensions checker 435 may only check if the node is at least a minimum height, or may only check if the node is at least a minimum width, rather than performing both tests.

If, however, the node satisfies the tests administered by the example candidate node identifier 420 (e.g., the element node identifier 425 determines that the node is an element node, the element node checker 430 determines that the node is not a tag, and the dimensions checker 435 determines that the node has sufficiently large dimensions to satisfy the geometric thresholds for identifying a node as a sponsored media node), the node is identified as the sponsored media node and classified as a sampling candidate node. As described above, a sponsored media container is assumed to include a sponsored media node associated with sponsored media. That is, the example media seeker 112 is embedded in the example sponsored media container 120 to track sponsored media in the sponsored media container 120. Thus, when the candidate node identifier 420 of FIG. 4 identifies a node that satisfies checks performed by the element node identifier 425, the element node checker 430 and the dimensions checker 435, the node is identified as the sponsored media node.

When a sponsored media node is identified, the user whose computer is presenting the media is eligible for being in the control group and the sponsored media is a candidate for "blanking." Accordingly, the candidate node identifier 420 triggers the example sampling candidate tester 440 to examine the sampling candidate node (e.g., the sponsored media node identified by the candidate node identifier 420) and to determine if the sampling candidate node is eligible for replacement. For example, the media seeker 112 may replace sponsored media with a public service announcement to prevent a control group user from being exposed to the sponsored media.

Whereas the candidate node identifier 420 eliminates a node from further processing based on comparisons to properties associated with a sponsored media node, the example sampling candidate tester 440 compares properties of the sampling candidate node to properties associated with replacement media. In the illustrated example of FIG. 4, the media seeker 112 includes the example sampling candidate tester 440 to examine a sampling candidate node and to determine if there is replacement media with matching dimensions as the sampling candidate node. As described above, in some examples, to create a control group, the media seeker 112 of the illustrated example may replace sponsored media with replacement media. In the illustrated example, the sampling candidate tester 440 determines whether the sampling candidate node is eligible for replacement (e.g., a candidate for sampling). For example, the sampling candidate tester 440 may parse a data structure (e.g., a list, a file, a lookup table, etc.) storing replacement media and/or replacement media dimensions to determine if there is replacement media that can be substituted for the sampling candidate node. In some examples, the replacement media may be pre-selected by, for example, the sponsor of the sponsored media. In some such examples, the replacement media and/or the replacement media dimensions may be stored in the example data store 465.

In some examples, the sampling candidate tester 440 may utilize a reference to the replacement media and/or the replacement media dimensions (e.g., may replace an HTML tag referencing the sponsored media with an HTML tag referencing the replacement media). For example, the replacement media and/or the replacement media dimensions may be hosted at the AME server 102, which enables the audience measurement entity to directly control the replacement media and/or the replacement media dimensions. In some examples, the replacement media and/or the replacement media dimensions are hosted at the media hosting server 104. By providing the sampling candidate tester 440 a reference to the replacement media and/or the replacement media dimensions, the replacement media and/or the replacement media dimensions may be changed at any time without modifying the replacement media and/or the replacement media dimensions in the example data store 465.

If matching replacement media dimensions are found by the sampling candidate tester 440, then the sampling candidate node is eligible for replacement (e.g., can be replaced), and the sampling candidate tester 440 identifies the candidate node as a sampling-eligible sponsored media node. In some examples, if the sampling candidate tester 440 is unable to find matching replacement media dimensions, the sampling candidate tester 440 eliminates the sampling candidate node from further consideration, and instructs the topology mapper 410 to continue identifying nodes that may be a sampling-eligible sponsored media node in the DOM. For example, to include the user in the control group, the user cannot be exposed to the sponsored media and, thus, replacement media is made available for replacing the sponsored media. In some such examples, when the media campaign is being designed, only media having the same dimensions as the sponsored media may be selected as replacement media. Thus, if the sampling candidate tester 440 is unable to find replacement media with the same dimensions as the sponsored media, the sampling candidate node is not eligible for replacement by the media seeker 112 and the media seeker 112 continues attempting to identify an eligible sponsored media node (e.g., in the sponsored media container 120) that has dimensions that match replacement media.

In the illustrated example of FIG. 4, the media seeker 112 includes the example timer 445 to monitor how long the web browser 106 has been loading (e.g., processing) the sponsored media container 120 and/or how much time elapsed since searching for a sponsored media node was initiated. For example, the timer 445 may include a clock that is initiated when, for example, the web browser 106 starts rendering the sponsored media container 120. When the timer 445 expires, if the sponsored media node has not been identified, then, to refrain from disrupting the user's experience, the timer 445 causes the topology mapper 410 to stop building DOMs of the sponsored media container 120.

In some examples, the timer 445 may include a clock and a calendar. In such examples, the timer 445 may associate a time period (e.g., 1:00 a.m. Central Standard Time (CST) to 1:01 a.m. CST) and a date (e.g., Jan. 1, 2014) with each generated impression entry from the impression logger 405 by, for example, appending the period of time and/or the date information to an end of the data in the beacon.

In the illustrated example of FIG. 4, the media seeker 112 includes the example surveyor 450 to determine whether to sample the user, and to survey the user when the user is selected to be in the sampling pool. In some examples, the surveyor 450 determines whether to sample the user based on campaign preferences 455 of the sponsor, the media provider and/or the AME. For example, the campaign preferences 455 may include a specification to instruct the media seeker 112 to include the user in the sampling pool (e.g., the test group or the control group) one out of every ten times that the web browser 106 requests tagged media containers (e.g., the sponsored media container 120), and include the user in the non-sampling pool the other nine out of ten times.

The example surveyor 450 determines whether to include the user in a test group or a control group based on the example campaign preferences 455. For example, the campaign preferences 455 may specify that when a sponsored media node is identified, the surveyor 450 is to include the user in the control group one out of five times (e.g., presented with the replacement media and surveyed every fifth time that the sponsored media container 120 is loaded) when the user is selected to be in the sampling pool and a sponsored media node is identified (e.g., replacement media is available for substituting with sponsored media). The campaign preferences 455 may also specify that the example surveyor 450 is to include the user in the test group the remaining times that the user is included in the sampling pool (e.g., four out of five times). In some examples, the campaign preferences 455 may include rules or patterns that specify combinations of activities that a user must perform to include the user in a particular group (e.g., the test group, the control group or the non-sampled group). Example methods, systems and apparatus to dynamically select whether the user is sampled or not sampled based on activities of the user are described in, for example, U.S. Patent Publication No. 2009/0150217, by Luff, entitled "Methods and Apparatus to Perform Consumer Surveys," which is hereby incorporated by reference in its entirety. The example surveyor 450 presents the user with a survey if the user is included in the sampling pool, and after the example media presenter 460 presents the sponsored media (e.g., the user included in the test group) or the replacement media (e.g., the user is included in the control group).

In the illustrated example of FIG. 4, the media seeker 112 includes the example media presenter 460 to present media to the user in response to obtaining the sponsored media container 120 from the media hosting server 104. For example, if a user is selected to be in the test group or the non-sampling group, the media presenter 460 presents the user with the sponsored media in the ad block associated with the sponsored media container 120 (e.g., the sponsored media 126). According to the illustrated example, the example media presenter 460 presents the media by not blocking the sponsored media and allowing the web browser 106 to present the sponsored media for the sponsored media container 120.

However, if a user is selected to be in the control group, the media presenter 460 "blanks" the ad block associated with the sponsored media container 120. In the illustrated example of FIG. 4, when the media presenter 460 is "blanking" an ad block, the media presenter 460 replaces the sponsored media with replacement media. For example, the media presenter 460 may retrieve the replacement media from, for example, the example data store 465. In some examples, the media presenter 460 retrieves the replacement media from the example AME server 102, from the media hosting server 104 and/or from another server which may be unaffiliated with the audience measurement entity and/or the media host.

While an example manner of implementing the media seeker 122 of FIGS. 1 and 3 is illustrated in FIG. 4, one or more of the elements, processes and/or devices illustrated in FIG. 4 may be combined, divided, re-arranged, omitted, eliminated and/or implemented in any other way. Further, any or all of the example AME server 102, the example media hosting server 104, the example client device 105, the example web browser 106 and/or the example media seeker 122 may be implemented by hardware, software, firmware and/or any combination of hardware, software and/or firmware. In addition, any or all of the example impression logger 405, the example topology mapper 410, the example candidate node identifier 420, the example element node identifier 425, the example element node checker 430, the example dimensions checker 435, the example sampling candidate tester 440, the example timer 445, the example surveyor 450, the example media presenter 460, the example data store 465 and/or, more generally, the example media seeker 122 of FIGS. 1 and/or 3 may be implemented by hardware, software, firmware and/or any combination of hardware, software and/or firmware. Thus, for example, any of the example AME server 102, the example media hosting server 104, the example client device 105, the example web browser 106, the example impression logger 405, the example topology mapper 410, the example candidate node identifier 420, the example element node identifier 425, the example element node checker 430, the example dimensions checker 435, the example sampling candidate tester 440, the example timer 445, the example surveyor 450, the example media presenter 460, the example data store 465 and/or, more generally, the example media seeker 122 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example AME server 102, the example media hosting server 104, the example client device 105, the example web browser 106, the example impression logger 405, the example topology mapper 410, the example candidate node identifier 420, the example element node identifier 425, the example element node checker 430, the example dimensions checker 435, the example sampling candidate tester 440, the example timer 445, the example surveyor 450, the example media presenter 460 and/or, more generally, the example data store 465 is/are hereby expressly defined to include a tangible computer readable storage device or storage disk such as a memory, a digital versatile disk (DVD), a compact disk (CD), a Blu-ray disk, etc. storing the software and/or firmware. Further still, the example media seeker 122 of FIGS. 1 and/or 3 may include one or more elements, processes and/or devices in addition to, or instead of, those illustrated in FIG. 4, and/or may include more than one of any or all of the illustrated elements, processes and devices.

Flowcharts representative of example machine readable instructions for implementing the media seeker 122 of FIGS. 1 and/or 4 are shown in FIGS. 5-8. In these examples, the machine readable instructions comprise programs for execution by a processor such as the processor 912 shown in the example media monitor 900 discussed below in connection with FIG. 9. The programs may be embodied in software stored on a tangible computer readable storage medium such as a CD-ROM, a floppy disk, a hard drive, a digital versatile disk (DVD), a Blu-ray disk, or a memory associated with the processor 912, but the entire programs and/or parts thereof could alternatively be executed by a device other than the processor 912 and/or embodied in firmware or dedicated hardware. Further, although the example programs are described with reference to the flowcharts illustrated in FIGS. 5-8, many other methods of implementing the example media seeker 122 may alternatively be used. For example, the order of execution of the blocks may be changed, and/or some of the blocks described may be changed, eliminated, or combined.

As mentioned above, the example processes of FIGS. 5-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example program 500 of FIG. 5 begins at block 502 when the example web browser 106 (FIGS. 1 and 4) initiates the example media seeker 122 (FIGS. 1 and 4). For example, the web browser 106 may process the example sponsored media container 120 (FIG. 1) and build a DOM (e.g., the example topology map 415) of the sponsored media container 120. At block 504, the example media seeker 122 examines the sponsored media container 120 for a sponsored media node. For example, the candidate node identifier 420 (FIG. 4) may examine one or more nodes in the sponsored media container 120 and identify a sponsored media node based on distinguishing assumptions and tiered tests. In the illustrated example, the operation of block 504 is implemented using the process described in conjunction with FIG. 6. Alternatively, other operations that identify sponsored media nodes may be utilized. In the illustrated example, when the candidate node identifier 420 identifies a sponsored media node at block 504, then the example media seeker 122 returns dimensions for the sponsored media and/or a sponsored media node identifier (e.g., a reference to the sponsored media node, a location of the sponsored media node inside the sponsored media container 120, etc.). In contrast, if the media seeker 122 did not identify a sponsored media node in the sponsored media container 120, the candidate node identifier 420 returns an empty or null value.

At block 506, the example media seeker 122 determines whether the sponsored media node in the sponsored media container 120 was identified. For example, the media seeker 122 may check if dimensions for sponsored media were returned. If, at block 506, the candidate node identifier 420 identified a sponsored media node in the sponsored media container 120 (e.g., the media seeker 122 received dimensions for a sponsored media node), then, at block 508, the media seeker 122 records an impression for the associated sponsored media. For example, the impression logger 405 (FIG. 4) may determine the associated sponsored media from a reference to the sponsored media included in the sponsored media node and credit an impression to the sponsored media. After block 508, the example process 500 of FIG. 5 ends.

If, at block 506, the example media seeker 122 did not identify a sponsored media node in the sponsored media container 120 (e.g., the media seeker 122 received empty or null values for dimensions), then, at block 510, the media seeker 122 determines whether to stop searching the sponsored media container 120 for the sponsored media node. For example, the example timer 445 (FIG. 4) may monitor the time (or number of search attempts initiated) since the web page 110 was loaded. When an elapsed time satisfies a threshold time (e.g., one second) (or a threshold number of search attempts have been made), then the media seeker 122 stops the search for the sponsored media. If, at block 510, the media seeker 122 determined to continue looking for a sponsored media node, then control returns to block 504 to continue examining the sponsored media container 120 for a sponsored media node. If, at block 510, the media seeker 122 determined to stop searching for a sponsored media node, then, at block 512, the impression logger 405 records that sponsored media was not identified in the sponsored media container 120. The example process 500 of FIG. 5 then ends.

Figure 6:
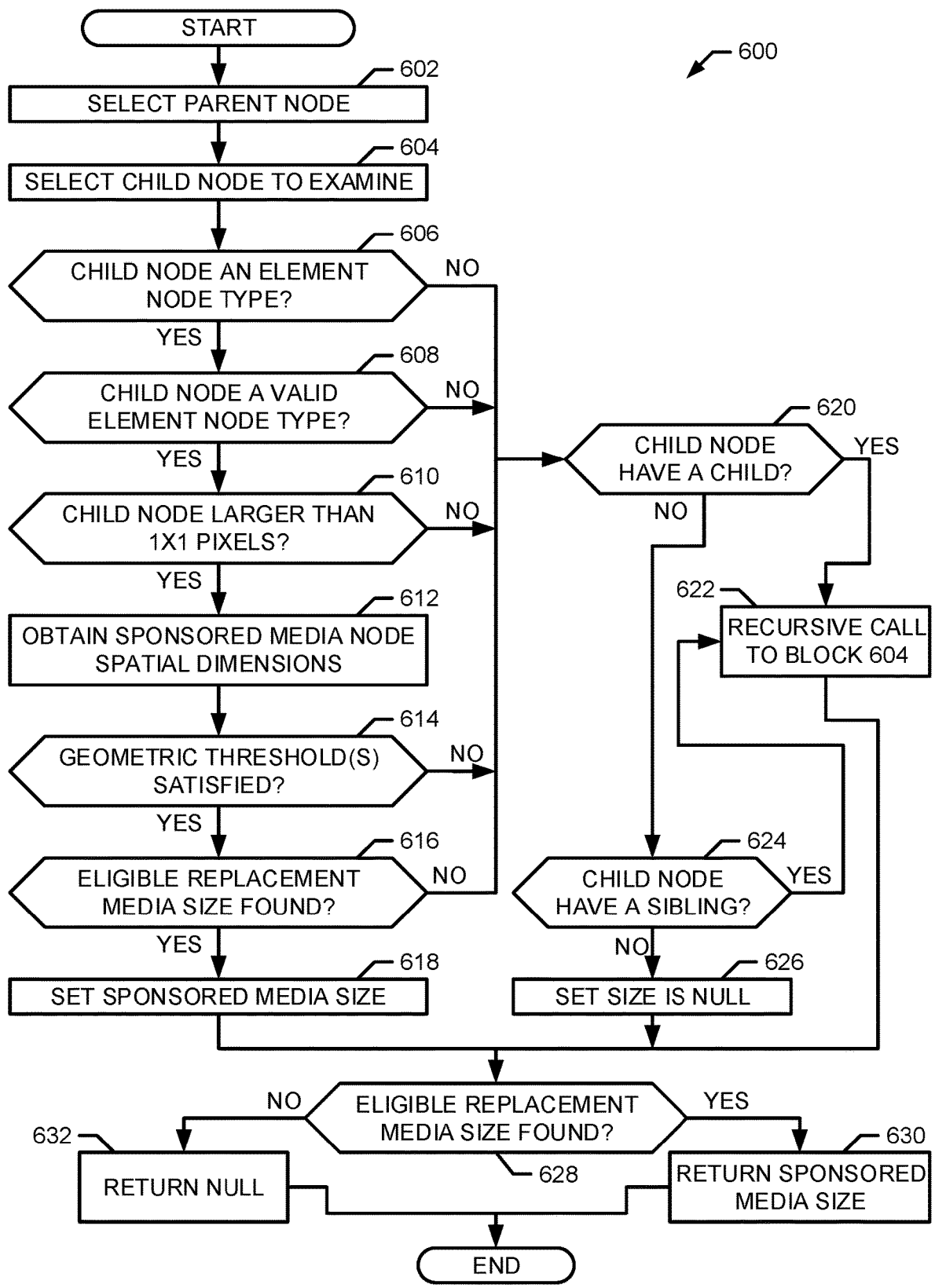

The example program of FIG. 6 may be used to implement block 504 of FIG. 5 to examine the sponsored media container 120 for a sponsored media node. The program of FIG. 6 begins at block 602 when the example media seeker 122 (FIGS. 1 and 4) selects a parent node of the media seeker 122 in the sponsored media container 510. For example, the topology mapper 410 (FIG. 4) may generate the topology map 415 of the nodes of the sponsored media container 120 and select the parent (or topmost) node of the sponsored media container. For example, the topology mapper 410 may perform introspection on the nodes to generate a DOM that maps the child node(s) and/or the sibling node(s) of each of the nodes. In some examples, if the media seeker 122 determines that the parent node is outside the sponsored media container 120 (e.g., a node within the body of the web page 110), then the program of FIG. 6 may end.

At block 604, the media seeker 122 selects a child node of the selected parent node to examine. For example, the topology mapper 410 may identify a child node of the topmost (or parent) node of the sponsored media container 120. At block 606, the media seeker 122 determines if the child node is an element type node. For example, each node in the DOM has a node type such as an element node, an attribute node, a comment node, etc. The example element node identifier 425 (FIG. 4) may determine if the child node is a "Node Type 1" node. If, at block 606, the element node identifier 425 determined that the child node was an element type node, then, at block 608, the element node identifier 425 determines whether the child node is a valid element node type. For example, the example element node checker 430 (FIG. 4) may check if the child node is a tag (e.g., a tracker, script, executable instructions, etc.).

If, at block 608, the element node checker 430 determined that the child node was a valid element node type, then, at block 610, the media seeker 122 determines whether the child node is larger than a pixel (e.g., has dimensions greater than 1×1 pixels). Sponsored media is media a sponsor pays to have exposed to users. Thus, if a node has dimensions less than, for example, a 1×1 pixel, in some systems, the child node cannot be a sponsored media node. For example, a tracker object, which is typically a 0×0 pixel or a 1×1 pixel, is not sponsored media, and, thus, can be eliminated from further consideration as a sponsored media node. If, at block 606, the media seeker 122 determined that the child node was not an element node, or, if, at block 608, the media seeker 122 determined that the child node was not a valid element node type, or, if, at block 610, the media seeker 122 determined that the child node was not larger than a pixel in size, then the child node is eliminated from further processing as a sponsored media node and control proceeds to block 620 to determine if the child node has a child node of its own.

If, at block 610, the media seeker 122 determined that the child node was larger than 1×1 pixels, then, at block 612, the media seeker 122 obtains the dimensions (e.g., the height (e.g., the number of pixels tall) and/or the width (e.g., the number of pixels across)) of the sponsored media node. For example, the example dimensions checker 435 (FIG. 4) may obtain the node height from the child node, or an attribute that is a descendent of the child node. At block 614, the candidate node identifier 420 determines if the dimensions of the child node satisfy the geometric thresholds to be a sponsored media node (e.g., the node height is greater than a minimum height (e.g., ninety pixels) and/or the node width is greater than a minimum width (e.g., 728 pixels)). For example, some industry standards define specific dimensions for sponsored media. Under current standards, sponsored media is at least ninety pixels tall and at least 728 pixels across. A node with a height of less than ninety pixels and/or a width of less than 728 pixels cannot be a sponsored media node in such a system, and can be eliminated from further consideration as the sponsored media node. If, at block 614, the candidate node identifier 420 determined that the dimensions of the node did not satisfy the geometric threshold(s), then control proceeds to block 620 to determine if the child node has a child node of its own.

If, at block 614, the media seeker 122 determined that the dimensions of the child node satisfied the geometric threshold(s) of a sponsored media node, the media seeker 122 classifies the child node as a sponsored media node. At block 616, the media seeker 122 determines if the sponsored media has dimensions eligible for replacement. For example, the sampling candidate tester 440 (FIG. 4) determines if there is replacement media available with the same (or nearly the same) dimensions as the sponsored media node. For example, the sampling candidate tester 440 may parse a lookup table stored in the example data store 465 (FIG. 4) and determine if a match (e.g., replacement media with the same or nearly the same dimensions as the sponsored media node) is returned. In some examples, the sampling candidate tester 440 retrieves the replacement media dimensions from the AME server 102, the media hosting server 104 and/or another server unaffiliated with the AME server 102 or the media hosting server 104.

If, at block 616, the example sampling candidate tester 440 was unable to identify replacement media with the same (or nearly the same) dimensions as the sponsored media node (e.g., the data store 465, the AME server 102, the media hosting server 104 and/or another server unaffiliated with the AME server 102 or the media hosting server 104 returns a null or empty value), then control proceeds to block 620 to determine if the child node has a child node of its own.

If, at block 616, the example sampling candidate tester 440 identified eligible replacement media (e.g., media with the same (or nearly the same) dimensions as the sponsored media node), then, at block 618, the media seeker 122 sets the size of the sponsored media using the dimensions retrieved by the dimensions checker 435. In some examples, the media seeker 122 may record a sponsored media identifier, a reference to the sponsored media node in the sponsored media container 120, etc. indicating that the sponsored media node was identified.

If, at block 606, the example media seeker 122 determined that the selected child node was not an element node type, or, if, at block 608, the media seeker 122 determined that the child node was not a valid element node type, or, if, at block 810, the media seeker 122 determined that the child node did not have dimensions larger than a 1×1 pixel, or, if, at block 614, the media seeker 122 determined that the dimensions of the child node did not satisfy at least a geometric threshold of a sponsored media node, or, if, at block 616, the media seeker 122 was unable to identify eligible replacement media, then, at block 620, the topology mapper 410 determines if the child node has a child node of its own. As discussed above, a node may include one or more levels of sub-nodes (e.g., child nodes). Thus, a sponsored media node may be a nested node at a "lower" level of the topology map 415. In the illustrated example, the topology mapper 410 performs introspection of the child node and determines if the child node has a child node.

If, at block 620, the example media seeker 122 determined that the child node does not have a child node, then, at block 622, the media seeker 122 determines if the child node has a sibling node (e.g., a node with the same parent node as the child node). For example, the topology mapper 410 may parse the topology map 415, may perform introspection on the sponsored media node, etc. to determine if the child node has a sibling node. If, at block 622, the topology mapper 410 determined that the child node did not have a sibling node, then, at block 624, the media seeker 122 sets the size of the sponsored media as a null value or empty value.

At block 626, the example media seeker 122 determines if the size for sponsored media has been set. For example, the media seeker 122 may check if the size of the sponsored media is set to a null value or empty value. If, at block 626, the media seeker 122 determined that the size of the sponsored media was set (e.g., is not a null value or an empty value), then, at block 628, the media seeker 122 returns the sponsored media size. In some examples, the media seeker 122 may return a sponsored media identifier for the sponsored media, a reference to the sponsored media node in the sponsored media container 120, etc. indicating that the sponsored media node was identified. After block 630, the example program of FIG. 6 then ends.

If, at block 626, the example media seeker 122 determined that the size of the sponsored media was not set (e.g., is a null value or an empty value), then, at block 630, the media seeker 122 returns a message indicating that the sponsored media node in the sponsored media container 120 was not found and/or eligible replacement media for the sponsored media was not identified. The example program of FIG. 6 then ends.

If, at block 620, the topology mapper 410 determined that the node has a child node, then control proceeds to block 632 and the media seeker 122 recursively calls block 604. For example, the media seeker 122 may select a child node of the child node identified by the topology mapper 415 to examine. In the illustrated example, recursively calling the analysis for the child nodes enables the media seeker 122 to traverse vertically (e.g., descendent nodes) through the nodes of the sponsored media container 120.

If, at block 622, the example topology mapper 410 determined that the child node has a sibling node, then control proceeds to block 632 and the media seeker 122 recursively calls the process starting at block 604. For example, the candidate node identifier 420 may select to examine a sibling node of the child node that is identified by the topology mapper 415. In the illustrated example, recursion calls on the sibling node(s) enables the media seeker 122 to traverse horizontally (e.g., sibling nodes) through the nodes of the sponsored media container 120.

After the media seeker 122 returns from the recursive call(s) at block 632, the size of the sponsored media has been set or is returned as a null value. Control then proceeds to block 626 to determine if the size of the sponsored media has been set.

Figure 7:
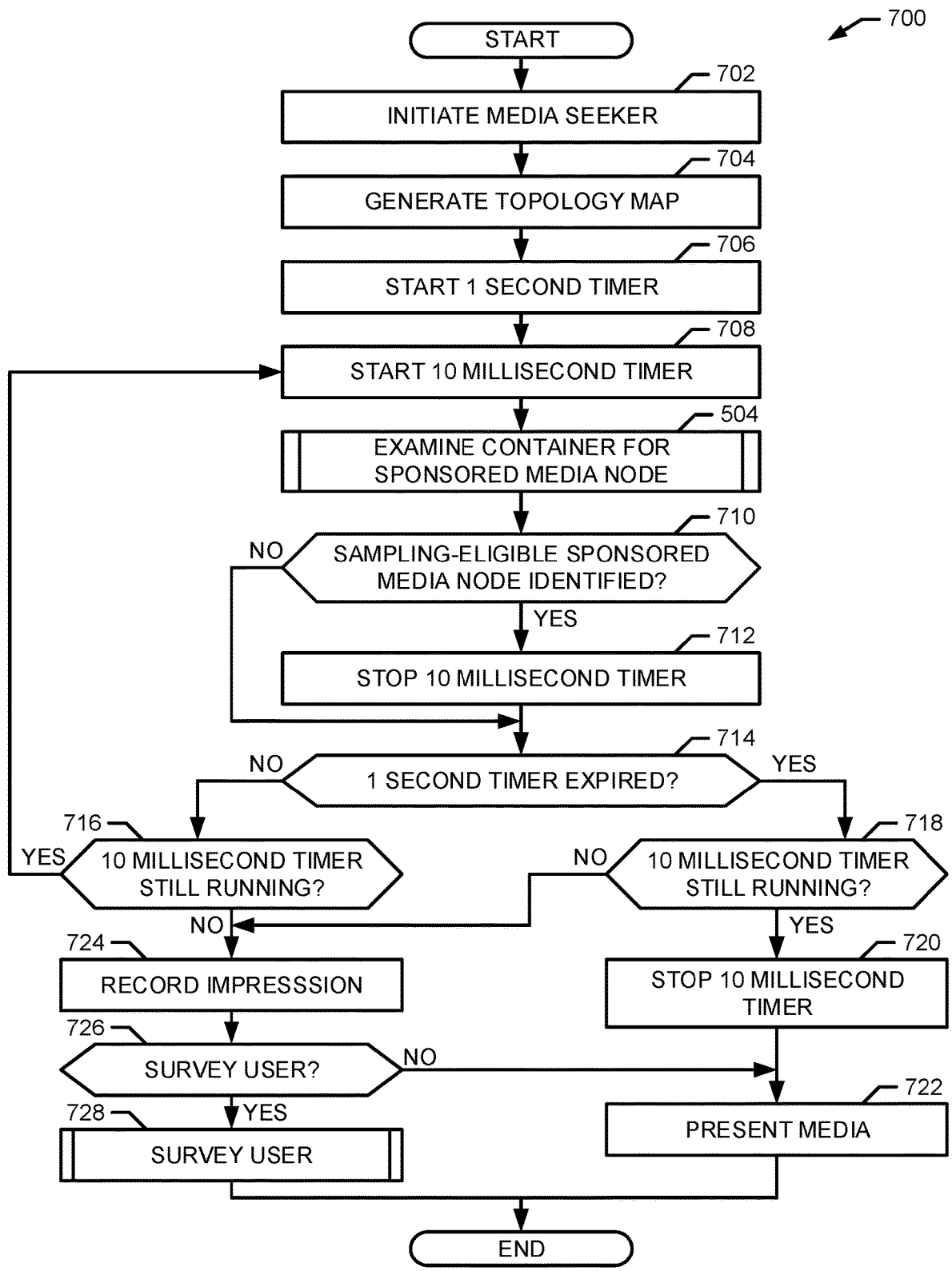

The example program 700 of FIG. 7 illustrates an alternate process of identifying sponsored media. The example program 700 begins at block 702 when the example web browser 106 (FIGS. 1 and 4) initiates the example media seeker 122 (FIGS. 1 and 4). For example, the web browser 106 may process the example sponsored media container 120 (FIG. 1). At block 704, the media seeker 122 generates a topology map of the sponsored media container 120. For example, the example topology mapper 410 (FIG. 4) may utilize introspection to build a DOM of the sponsored media container 120. At block 706, the media seeker 122 initiates a one second time-out timer. For example, the media seeker 122 may initiate the example timer 445 (FIG. 4). In the illustrated example, to maintain an uninterrupted user experience for the user (e.g., to ensure the web browser operation is not degraded by the searching process), the media seeker 122 uses a one second time interval as a cutoff for searching activities.

At block 708, the media seeker 122 initiates the example timer 445 for a ten millisecond loop. In the illustrated example, the media seeker 122 utilizes a ten millisecond loop to determine when sponsored media is identified. At block 504, the example media seeker 122 examines the sponsored media container 120 for a sponsored media node. For example, the candidate node identifier 420 (FIG. 4) may examine one or more nodes in the sponsored media container 120 and identify a sponsored media node based on distinguishing assumptions and tiered tests. In the illustrated example, the operation of block 504 may be implemented using, for example, the process described in conjunction with FIG. 6.

At block 710, the example media seeker 122 determines whether the sponsored media container 120 included a sampling-eligible sponsored media node. For example, the example media seeker 122 may check whether the example candidate node identifier 420 returned dimensions for sponsored media, whether the example sampling candidate tester 440 (FIG. 4) returned dimensions matching (e.g., the same or nearly the same) as replacement media, etc. If, at block 710, the media seeker 122 identified a sampling-eligible sponsored media node, then, at block 712, the media seeker 122 stops the ten millisecond timer.

If, at block 710, the example media seeker 122 did not identify a sampling-eligible sponsored media node, or, after the media seeker 122 stops the ten millisecond timer at block 712, then, at block 714, the media seeker 122 determines whether the time-out timer has expired (e.g., whether one second has passed). In some examples, the media seeker 122 counts the number of times the ten millisecond loop repeats to determine if one second has passed. If, at block 714, the media seeker 122 determined that the time-out timer had not expired, then, at block 716, the media seeker 122 checks whether the ten millisecond timer is still running. For example, when the media seeker 122 identifies a sampling-eligible sponsored media node, then the media seeker 122 stops the ten millisecond timer. Accordingly, if, at block 716, the media seeker 122 determined that the ten millisecond timer was still running, then, control returns to block 708 and another ten millisecond timer is started (e.g., the timer 445 is initiated) to search for sponsored media in the sponsored media container 120.

If, at block 714, the example media seeker 122 determined that the time-out timer has expired, then, at block 718, the media seeker 122 determines whether the ten millisecond timer is still running. If the ten millisecond timer is running after the time-out timer has expired, then the media seeker 122 was unable to identify a sampling-eligible sponsored media node (e.g., the candidate node identifier 420 and/or the sampling candidate tester 440 returned a null value or an empty value). At block 720, the media seeker 122 stops the ten millisecond timer. At block 722, the media seeker 122 presents the media (e.g., the sponsored media 126). For example, the media presenter 460 (FIG. 4) presents the media included in the sponsored media container 120. The example process 700 of FIG. 7 then ends.

If, at block 716 or at block 718, the example media seeker 122 determined that the ten millisecond timer was not running, then, at block 724, the media seeker 122 records an impression for the sponsored media associated with the sampling-eligible sponsored media node. For example, the impression logger 405 (FIG. 4) may determine the sponsored media from a reference to the sponsored media included in the sampling-eligible sponsored media node and credit an impression to the sponsored media. At block 726, the media seeker 126 determines whether to survey the user. For example, the surveyor 450 (FIG. 4) may utilize criteria to determine whether to include the user in the sampling pool (e.g., include the user in the control group or the test group).

If, at block 726, the example media seeker 122 determined to include the user in the sampling pool, then, at block 728, the media seeker 122 surveys the user. For example, the surveyor 450 may include the user in a control group (e.g., present the user with replacement media or "blank" the sponsored media and sample the user) or include the user in a test group (e.g., present the user with the sponsored media and sample the user). In the illustrated example, the operation of block 728 may be implemented using the process described in conjunction with FIG. 8 or any other process. The example process 700 of FIG. 7 then ends.

If, at block 726, the example media seeker 122 determined not to survey the user, or after the media seeker 122 stopped the ten millisecond timer at block 720, then, control proceeds to block 722 and the media seeker 122 presents the media (e.g., the sponsored media 126). For example, the media presenter 460 presents the media included in the sponsored media container 120. The example process 700 of FIG. 7 then ends.

Figure 8:
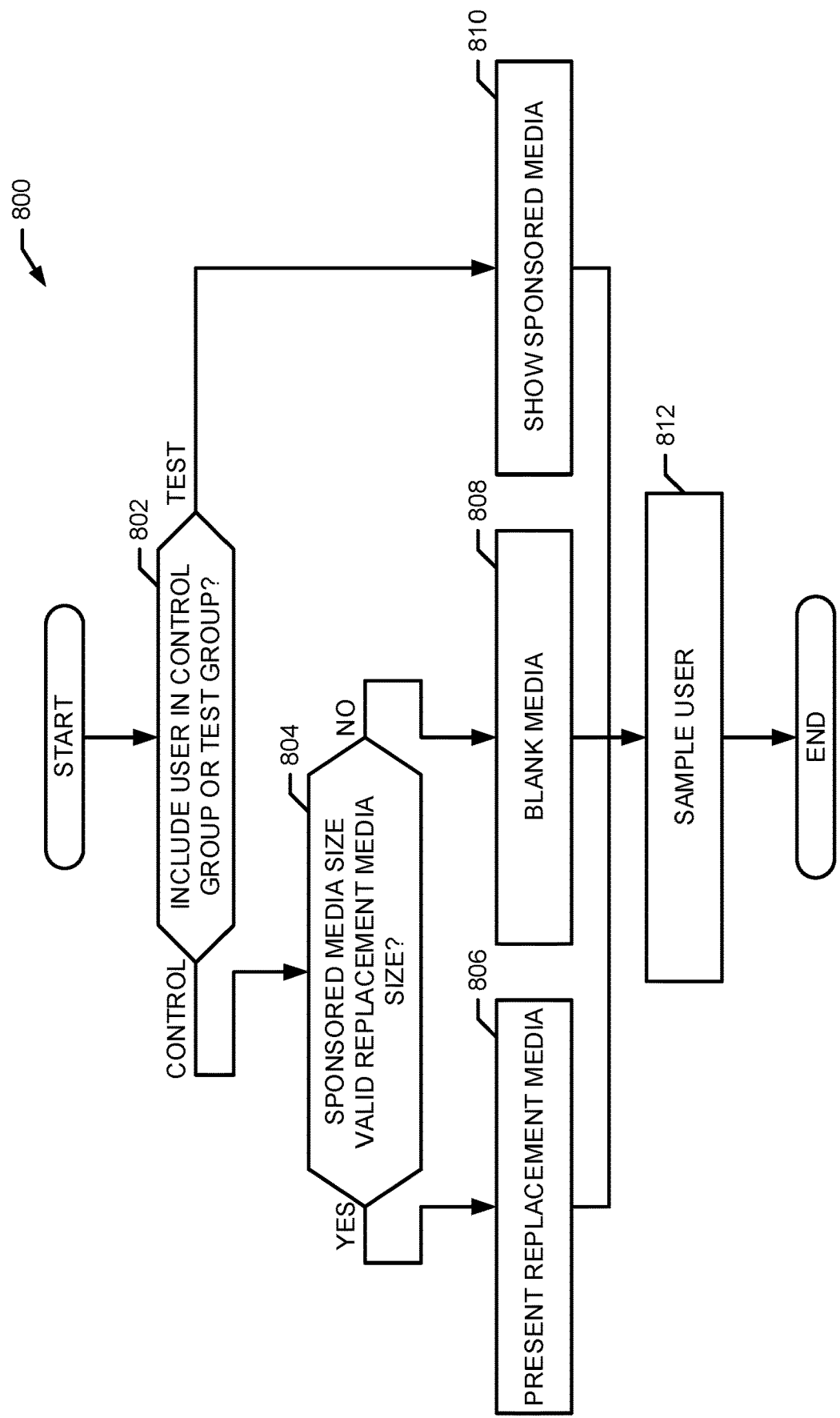

The example program 800 of FIG. 8 may be used to implement block 728 of FIG. 7 to survey a user. The program 800 of FIG. 8 begins at block 802 when the example media seeker 122 (FIGS. 1 and 4) determines whether to include the user in a control group or a test group. For example, the surveyor 450 (FIG. 4) may utilize first criteria to determine whether to include the user in the sampling pool. If the user is selected to be included in the sampling pool, then the surveyor 450 may utilize second criteria to determine whether to include the user in the control group or the test group. In some examples, the first criteria and/or the second criteria may be rules or patterns specified for including the user in the test group, the control group, or the non-sampled group. In some examples, the first criteria and/or the second criteria may be specified by the sponsor, the media provider and/or the audience measurement entity during development of the media campaign in which the sponsored media is included.

If, at block 802, the example surveyor 450 selected to include the user in the control group, then, at block 804, the media seeker 122 determines whether the sponsored media size (e.g., the size of the sponsored media) matches (e.g., is the same or nearly the same) as the dimensions of replacement media. For example, the media seeker 122 may parse a lookup table stored in the example data store 465 (FIG. 4) and determine if a match (e.g., replacement media with the same or nearly the same dimensions returned by the example dimensions checker 435 (FIG. 4). If, at block 804, the media seeker 122 determined that the sponsored media size was a valid replacement media size, then, at block 806, the media seeker 122 presents the replacement media with the matching dimensions. For example, the media presenter 460 (FIG. 4) may present the user with a public service announcement instead of the sponsored media included in the sponsored media container 120.

If, at block 804, the example media seeker 122 determined that the sponsored media size was not a valid replacement media size, then, at block 808, the media seeker 122 "blanks" the sponsored media. For example, the media presenter 460 may modify the dimensions of the sponsored media so that presentation of the sponsored media is unperceivable to the user.

If, at block 802, the user was not selected to be in the control group (e.g., the user was selected to be in the test group), then, at block 810, the media presenter 460 presents the user with the sponsored media identified in the sponsored media container 120. At block 812, the media seeker 122 samples the user. For example, the surveyor 450 may present the user with a survey. For example, a user in the control group may be asked how they feel about a product manufacturer after being exposed to a public service announcement, while a user in the test group may be asked how they feel about the product manufacturer after being exposed to media sponsored by the product manufacturer (e.g., an advertisement for a product sold by the product manufacturer). In some examples, the survey may be selected as described in Luff, U.S. Patent Publication No. 2009/0150217. The example program 800 of FIG. 8 then ends.

Figure 9:
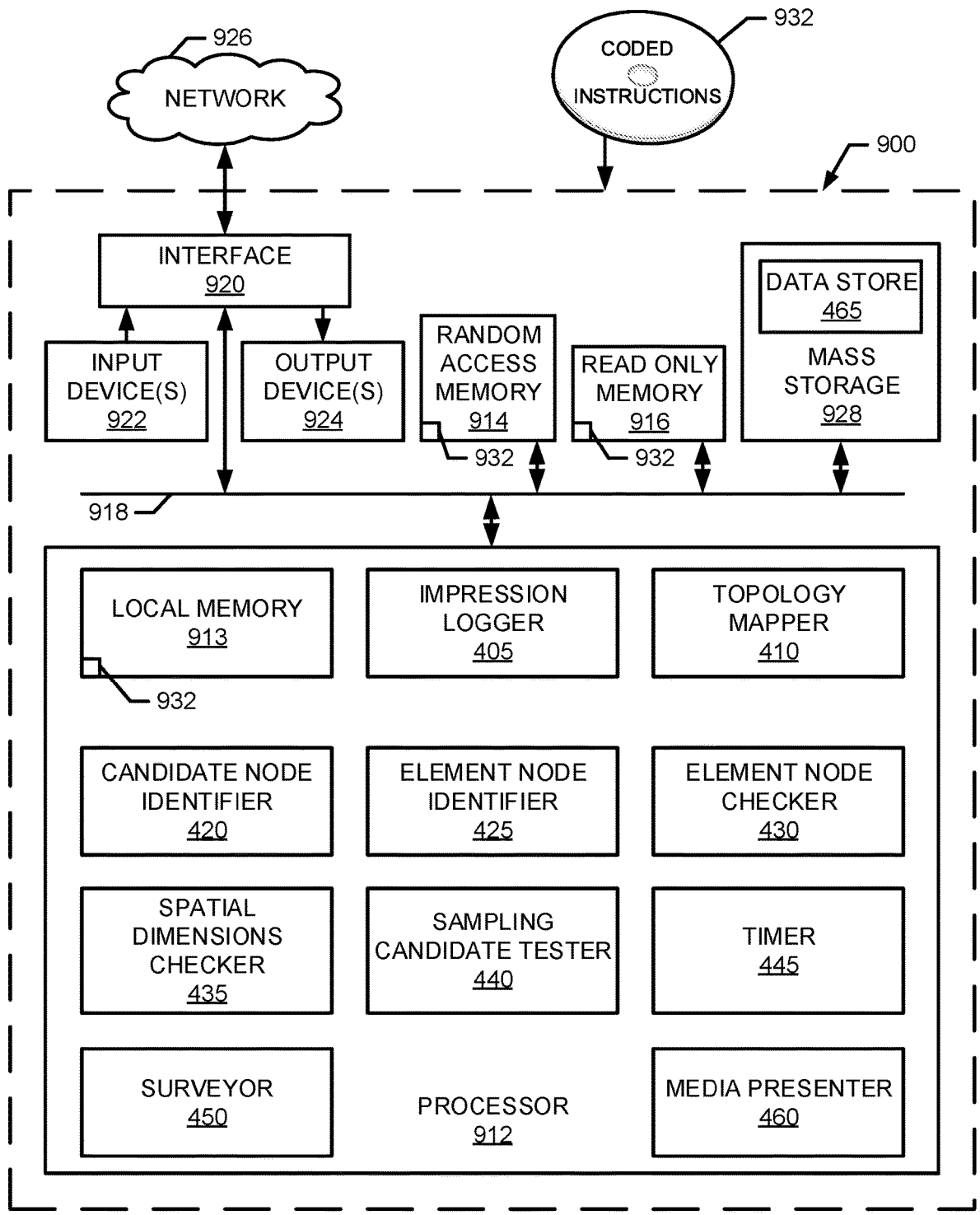
FIG. 9 is a block diagram of an example media monitor capable of executing the example machine readable instructions of FIGS. 5-8 to implement the example media seeker of FIGS. 1 and/or 4.

FIG. 9 is a block diagram of an example media monitor 900 capable of executing the instructions of FIGS. 5-8 to implement the media seeker 122 of FIGS. 1 and/or 4. The media monitor 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The media monitor 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example executes the instructions to implement the example impression logger 405, the example topology mapper 410, the example candidate node identifier 420, the example element node identifier 425, the example element node checker 430, the example dimensions checker 435, the example sampling candidate tester 440, the example timer 445, the example surveyor 450 and the example media presenter 460. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The media monitor 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The media monitor 900 of the illustrated example also includes one or more mass storage devices 928 for storing software and/or data. In the illustrated example, the mass storage device 928 includes the example data store 465. Examples of such mass storage devices 928 include floppy disk drives, hard drive disks, compact disk drives, Blu-ray disk drives, RAID systems, and digital versatile disk (DVD) drives.

The coded instructions 932 of FIGS. 5-8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture enable identifying sponsored media in the Document Object Model and, thereby, increasing the validity of the control group and the brand effectiveness metric methodology. Examples disclosed herein advantageously utilize recursive calls on nodes in the DOM to traverse the nodes horizontally and vertically through the DOM. Thus, examples disclosed herein enable discovery and investigation of dynamic objects which may not exist at the time the initial search for the sponsored media was initiated. Examples disclosed herein may then "blank" the sponsored media when the sponsored media is found.

Moreover, to maintain an uninterrupted user experience for the user and reduce consumption of computing resources, examples disclosed herein limit the amount of time that elapses searching for the sponsored media. For example, examples disclosed herein initiate a ten millisecond timer when the search is initiated and, if, after one second, the sponsored media is not identified, the impression for the sponsored media is logged, and the user is selected to be in the test group or in the non-sampled group. In addition, examples disclosed herein advantageously search for the sponsored media by administering various tests in an order that reduces the amount of computation work done and/or is otherwise easier to perform.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to identify sponsored media in a webpage, the method comprising:
   in response to initiation of a search for sponsored media in a first branch of a document object model for a webpage, initiating, by executing an instruction via a processor, a first timer having a first search time period and a second timer having a second search time period, wherein the first search time period and the second search time period overlap;

terminating, by executing an instruction via the processor, the search upon completion of traversing the first branch when the search reaches a document node that is at a root of the first branch, the first branch including a candidate node;

in response to identifying the candidate node as sponsored media, parsing, by executing an instruction via the processor, the sponsored media to generate monitoring information; and modifying, by executing an instruction via the processor, a user agent setting to include a unique identifier.

2. The method as defined in claim 1, further including:
generating a topology map of the webpage based on the document object model; and
identifying a child node to examine by traversing the topology map.

3. The method as defined in claim 1, further including:
determining whether to include a user in a sample group in response to identifying the sponsored media; and
based on a determination to include a user in the sample group, presenting the user with the sponsored media based on a second determination to include the user in a test group.

4. The method as defined in claim 3, further including blanking the sponsored media based on the second determination to include the user in a control group.

5. The method as defined in claim 3, further including presenting the user with the sponsored media based on a determination to exclude the user from the sample group.

6. The method as defined in claim 1, further including repeatedly examining child nodes in a topology map of the webpage until at least one of a sponsored media node is identified or there are no further nodes to examine.

7. The method as defined in claim 1, further including:
repeating the search for the sponsored media until at least one of a sponsored media node has been identified or the first timer expires.

8. The method as defined in claim 7, further including presenting the sponsored media during presentation of the webpage when the first timer expires.

9. An apparatus to identify sponsored media in a webpage, the apparatus comprising:
an initiator to:
initiate a first timer having a first search time period and a second timer having a second search time period in response to an initiation of a search for sponsored media in a first branch of a document object model for a webpage, wherein the first search time period and the second search time period overlap; and
terminate the search upon completion of traversing the first branch when the search reaches a document node that is at a root of the first branch, the first branch including a candidate node; and
an impression logger to:
in response identifying the candidate node as sponsored media, parse the sponsored media to generate monitoring information; and
modify a user agent setting to include a unique identifier.

10. The apparatus as defined in claim 9, further including a topology mapper to:
generate a topology map of the webpage based on the document object model; and
identify a child node to examine by traversing the topology map.

11. The apparatus as defined in claim 10, further including a candidate node identifier to determine if the child node has a characteristic common to sponsored media nodes by comparing node types.

12. The apparatus as defined in claim 11, wherein the candidate node identifier determines that a first node is not the candidate node when the first node includes executable instructions.

13. The apparatus as defined in claim 11, wherein the candidate node identifier repeats the search for the sponsored media until at least one of a sponsored media node has been identified or the first timer expires.

14. The apparatus as defined in claim 10, wherein the topology mapper repeatedly examines child nodes in the topology map of the webpage until at least one of a sponsored media node is identified or there are no further nodes to examine.

15. The apparatus as defined in claim 9, further including:
a surveyor to determine whether to include a user in a sample group in response to identifying the sponsored media; and
a media presenter to present the user with the sponsored media based on a second determination by the surveyor to include the user in a test group.

16. The apparatus of claim 15, wherein the media presenter presents the sponsored media during presentation of the webpage when the first timer expires.

17. A tangible computer readable storage medium comprising instructions that, when executed, cause a machine to at least:
initiate a first timer having a first search time period and a second timer having a second search time period, in response to an initiation of a search for sponsored media in a first branch of a document object model for a webpage, the first search time period and the second search time period overlap;
terminate the search upon completion of traversing the first branch when the search reaches a document node that is at a root of the first branch, the first branch including a candidate node;
in response to identifying the candidate node as sponsored media, parse the sponsored media to generate monitoring information; and
modify a user agent setting to include a unique identifier.

18. The tangible computer readable storage medium as defined in claim 17, wherein the instructions, when executed, cause the machine to:
generate a topology map of the webpage based on the document object model; and
identify a child node to examine by traversing the topology map.

19. The tangible computer readable storage medium as defined in claim 17, wherein the instructions, when executed, cause the machine to determine that a first node is not the candidate node when the first node includes executable instructions.

20. The tangible computer readable storage medium as defined in claim 17, wherein the instructions, when executed, cause the machine to:
determine whether to include a user in a sample group in response to identifying the sponsored media; and
based on a determination to include a user in the sample group, present the user with the sponsored media based on a second determination to include the user in a test group.

21. The tangible computer readable storage medium as defined in claim 17, wherein the instructions, when executed, cause the machine to repeatedly examine child nodes in a topology map of the webpage until at least one of a sponsored media node is identified or there are no further nodes to examine.

22. The tangible computer readable storage medium as defined in claim 17, wherein the instructions, when executed, cause the machine to:
identify the first branch based on a tag included in the sponsored media, the tag identifiable by a tracker;
in response to identifying the first branch, identify a first node of the first branch as a parent node;
determine if the parent node is a sponsored media node; and
in response to determining that the parent node is not a sponsored media node, recursively parsing child nodes of the parent node within the first branch to identify the sponsored media node.

23. The tangible computer readable storage medium as defined in claim 17, wherein the instructions, when executed, cause the machine to repeat the search for the sponsored media until at least one of the sponsored media node has been identified or the first timer expires.

24. The tangible computer readable storage medium as defined in claim 23, wherein the instructions, when executed, cause the machine to present the sponsored media during presentation of the webpage when the first timer expires.

25. An apparatus comprising:
at least one memory;
instructions in the apparatus; and
processor circuitry to execute the instructions to:
initiate a first timer having a first search time period and a second timer having a second search time period in response to an initiation of a search for sponsored media in a first branch of a document object model for a webpage, wherein the first search time period and the second search time period overlap; and
terminate the search upon completion of traversing the first branch when the search reaches a document node that is at a root of the first branch, the first branch including a candidate node; and
in response identifying the candidate node as sponsored media, parse the sponsored media to generate monitoring information; and
modify a user agent setting to include a unique identifier.

26. The apparatus of claim 25, wherein the processor circuitry is to:
generate a topology map of the webpage based on the document object model; and
identify a child node to examine by traversing the topology map.

27. The apparatus of claim 26, wherein the processor circuitry is to repeatedly examine child nodes in the topology map of the webpage until at least one of a sponsored media node is identified or there are no further nodes to examine.

28. The apparatus of claim 25, wherein the processor circuitry is to determine a child node has a characteristic common to sponsored media nodes by comparing node types.

29. The apparatus of claim 28, wherein the processor circuitry is to determine that a first node is not the candidate node when the first node includes executable instructions.

30. The apparatus of claim 28, wherein the processor circuitry is to repeat the search for the sponsored media until at least one of a sponsored media node has been identified or the first timer expires.

31. The apparatus of claim 25, wherein the processor circuitry is to:
determine whether to include a user in a sample group in response to identifying the sponsored media; and
present the user with the sponsored media based on a second determination to include the user in a test group.

32. The apparatus of claim 25, wherein the processor circuitry is to present the sponsored media during presentation of the webpage when the first timer expires.

33. The apparatus of claim 25, wherein the processor circuitry is to:
identify the first branch based on a tag included in the sponsored media, the tag identifiable by a tracker;
in response to identifying the first branch, identify a first node of the first branch as a parent node;
determine if the parent node is a sponsored media node; and
in response to determining that the parent node is not a sponsored media node, recursively parsing child nodes of the parent node within the first branch to identify the sponsored media node.

* * * * *